(12) United States Patent
Bowyer

(10) Patent No.: US 7,016,779 B2
(45) Date of Patent: Mar. 21, 2006

(54) CONTROL SYSTEM

(75) Inventor: Robert Owen Bowyer, Cambridge (GB)

(73) Assignee: Cambridge Consultants Limited, (GB)

( * ) Notice: Subject to any disclaimer, the term of this patent is extended or adjusted under 35 U.S.C. 154(b) by 0 days.

(21) Appl. No.: 10/502,904

(22) PCT Filed: Jan. 31, 2003

(86) PCT No.: PCT/GB03/00456

§ 371 (c)(1),
(2), (4) Date: Jan. 18, 2005

(87) PCT Pub. No.: WO03/065135

PCT Pub. Date: Aug. 7, 2003

(65) Prior Publication Data

US 2005/0131620 A1   Jun. 16, 2005

(30) Foreign Application Priority Data

Jan. 31, 2002   (GB) ................... 0202289

(51) Int. Cl.
*F02D 41/26* (2006.01)
*G05B 13/04* (2006.01)

(52) U.S. Cl. .................................. 701/108
(58) Field of Classification Search ............ 701/108, 701/109, 102, 115; 123/674, 680, 675; 60/274
See application file for complete search history.

(56) References Cited

U.S. PATENT DOCUMENTS

| | | |
|---|---|---|
| 4,639,853 A | 1/1987 | Rake et al. |
| 4,653,449 A | 3/1987 | Kamei et al. |
| 5,301,101 A | 4/1994 | Macarthur et al. |
| 5,424,942 A | 6/1995 | Dong et al. |
| 6,014,963 A * | 1/2000 | Narita ................. 701/109 |
| 6,019,093 A * | 2/2000 | Kitagawa ............ 123/674 |
| 6,035,639 A | 3/2000 | Kolmanovsky et al. |

(Continued)

FOREIGN PATENT DOCUMENTS

EP   0 984 153 A2   3/2000

OTHER PUBLICATIONS

R.O. Bowyer, 1999, "Multiple order models in predictive control", D.Phil thesis, Dept. of Engineering Science, Oxford University.

(Continued)

*Primary Examiner*—Hieu T. Vo
(74) *Attorney, Agent, or Firm*—Fogg & Associates, LLC; David N. Fogg

(57) ABSTRACT

There is described a method for controlling a system, for example a Diesel engine, that is subject to transient changes of target outputs. The target outputs specify outputs required from the system. "Steady state" information is used to give optimum inputs for the system when the target outputs are substantially constant. A model of the system is used to predict the outputs of the system in response to candidate new values for the inputs of the system. The method combines the steady state information with the predicted response of the system to determine inputs to the system which will cause the system outputs to match the target outputs as closely as possible. For each candidate (in one embodiment), the method calculates the difference between the steady state inputs and a candidate, and the difference between the target outputs and the predicted outputs that would result from the adoption of that candidate, to determine an optimum candidate which is then used to update the inputs to the system.

47 Claims, 12 Drawing Sheets

U.S. PATENT DOCUMENTS

| | | |
|---|---|---|
| 6,035,640 A | 3/2000 | Kolmanovsky et al. |
| 6,067,800 A | 5/2000 | Kolmanovsky et al. |
| 6,076,353 A | 6/2000 | Freudenberg et al. |
| 6,278,899 B1 | 8/2001 | Piche et al. |
| 6,279,551 B1 | 8/2001 | Iwano et al. |

OTHER PUBLICATIONS

"Model-based EGR control development for an HSDI engine", K.P. Duffy et al. Proceedings of ASME Internal Combustion Engine 1999 Fall Conference, Oct. 16-20, 1999, Ann Arbor, MI.

* cited by examiner

CONTROL SYSTEM

This application claims priority to International Patent Application No. PCT/GB03/00456 filed on Jan. 31, 2003, which claims priority to GB Patent Application No. 0202289.5 filed on Jan. 31, 2002.

This invention relates to control systems and, more particularly but not exclusively, to methods of controlling supercharged compression-ignition engines having exhaust gas recirculation (EGR) systems and, even more particularly, to methods of controlling during transients the air-to-fuel ratio (AFR) and amount of exhaust gas recirculation in Diesel engines equipped with variable geometry turbochargers (VGTs).

Diesel engines are often provided with a turbocharger to increase the amount of air induced into the cylinders of the engine so that more oxygen is available and thus more fuel can be burnt at each stroke. Turbochargers use some of the energy of the exhaust gases to drive a turbine which in turn drives a compressor mounted on a common shaft. The compressor compresses ambient air and directs it into the intake manifold. In general, a turbocharger can only be well-matched to the characteristics of the engine around a relatively narrow band of engine operating speeds. For example, at a particular engine operating speed the turbocharger may triple the pressure in the inlet manifold to 2 bar, thus tripling the mass of air induced into the cylinders and consequently tripling both the mass of fuel that may be burnt and the power that may be developed by the engine.

VGTs allow the characteristics of the turbocharger to be modified so that it may be well matched to the characteristics of the engine over a wider range of engine speeds. This is conventionally accomplished by changing the angle of the inlet guide vanes on the turbine stator.

There already exist various standards defining the amount of particulate matter (PM) and nitrogen oxides ($NO_x$) that may be emitted by Diesel engines used as power plants for vehicles, particularly cars and lorries. PM emissions are caused when insufficient oxygen is admitted to the engine to fully burn the fuel. On the other hand, an excess of oxygen raises the combustion temperature of the fuel and increases $NO_x$ emissions. The AFR is the ratio of the mass of air (assumed to be 21% oxygen) admitted into the engine to the mass of fuel admitted into the engine. PM and $NO_x$ emissions can both be controlled by maintaining the AFR of the engine at a predetermined setting, typically 25:1. Although the AFR is a ratio it is conventionally referred to as a single number and this convention will be adopted hereinafter. An AFR of less than 20 (i.e. less than 20:1) typically results in a sooty exhaust due to excessive PM whilst an AFR of more than 35 typically results in excessive $NO_x$ emissions.

Unlike a spark ignition engine (where the amount of air admitted is throttled according to the load of the engine and the fuel is ignited by a spark), a Diesel engine operates by compression-ignition and thus a sufficient charge of air must always be admitted into the cylinders in order to ensure that a temperature high enough to ignite the fuel is developed during compression. The amount of fuel admitted into a Diesel engine depends upon the load of the engine and consequently the AFR also varies depending upon the load of the engine.

A VGT and EGR can be used to regulate the AFR and thus minimise the emissions under different operating conditions. When the AFR is too low then the VGT is used to force extra air into the engine to increase the AFR back to 25, thereby reducing PM emissions. When the AFR is too high then exhaust gas is recirculated from the outlet manifold to the inlet manifold where it mixes with, and dilutes, the air about to be induced into the engine. Exhaust gas is mainly nitrogen, carbon dioxide and water vapour and reduces the amount of available oxygen induced into the engine (whilst maintaining a sufficient charge volume to produce ignition), thereby reducing the combustion temperature and $NO_x$ emissions.

If too much exhaust gas is recirculated then the reliability of the engine is reduced due to adverse effects of carbon particles (on the engine oil) and sulphur oxides (which are acidic). An EGR fraction of 10% (i.e. recirculated exhaust gas forms 10% of the charge admitted into the engine) typically gives a satisfactory trade-off between $NO_x$ emissions and reliability.

Previous emissions standards were established effectively under static operating conditions i.e. where the engine was operating at several fixed loads and speeds. More recent emission standards (for example the European EURO 4 and US Federal Tier 2 Standards) also introduce transients, such as acceleration and braking to simulate driving around a city, into the emissions conformance tests. PM and $NO_x$ emissions must be maintained below prescribed limits during both the static and transient parts of the test cycles.

The present invention seeks to provide a control arrangement for a Diesel engine equipped with EGR and VGT which permits control of engine emissions during transient operating conditions.

According to the present there is disclosed a control method for a compression ignition engine wherein at least one of the amount of exhaust gas recirculation and air intake boosting is variable by means of an actuator, the method comprising the steps of:

receiving a signal indicative of the rate at which fuel is admitted to the engine;

producing a signal based upon the fuelling rate indicative of a predetermined, and substantially optimised, amount of air and of the amount of exhaust gas to be admitted under steady state conditions into the engine;

determining, based upon the fuelling rate, the amount of air required to be induced into the engine to substantially maintain the air-to-fuel ratio of the engine at a predetermined level;

determining, based upon the determined amount of air, the amount of exhaust gas to be recirculated;

predicting the future behaviour of the engine using a model;

generating a set point for the actuator by minimising a cost function associated with the set point wherein the cost function includes a cost associated with the departure from the steady state values and a cost associated with the departure from the conditions required to satisfy the predicted future behaviour of the engine;

altering the boost pressure and/or exhaust gas recirculation based upon the actuator setting determined by the cost function.

According to other aspects of the invention there are provided a controller embodying the method and a compression ignition engine comprising such a controller.

As is explained later in more detail, an advantage of the control method is that it allows tighter control of emissions compared to prior art control methods, for example PID (Proportional, Integral, Derivative) control, methods. The improved performance allows a trade-off to be made with other criteria (for example, fuel efficiency), thus improving the fuel efficiency of the engine without exceeding the prescribed limits of the more recent emission standards.

EMBODIMENTS

Exemplary embodiments of the present invention will now be described with reference to the accompanying drawings in which.

EMBODIMENT 1

Figure 1:
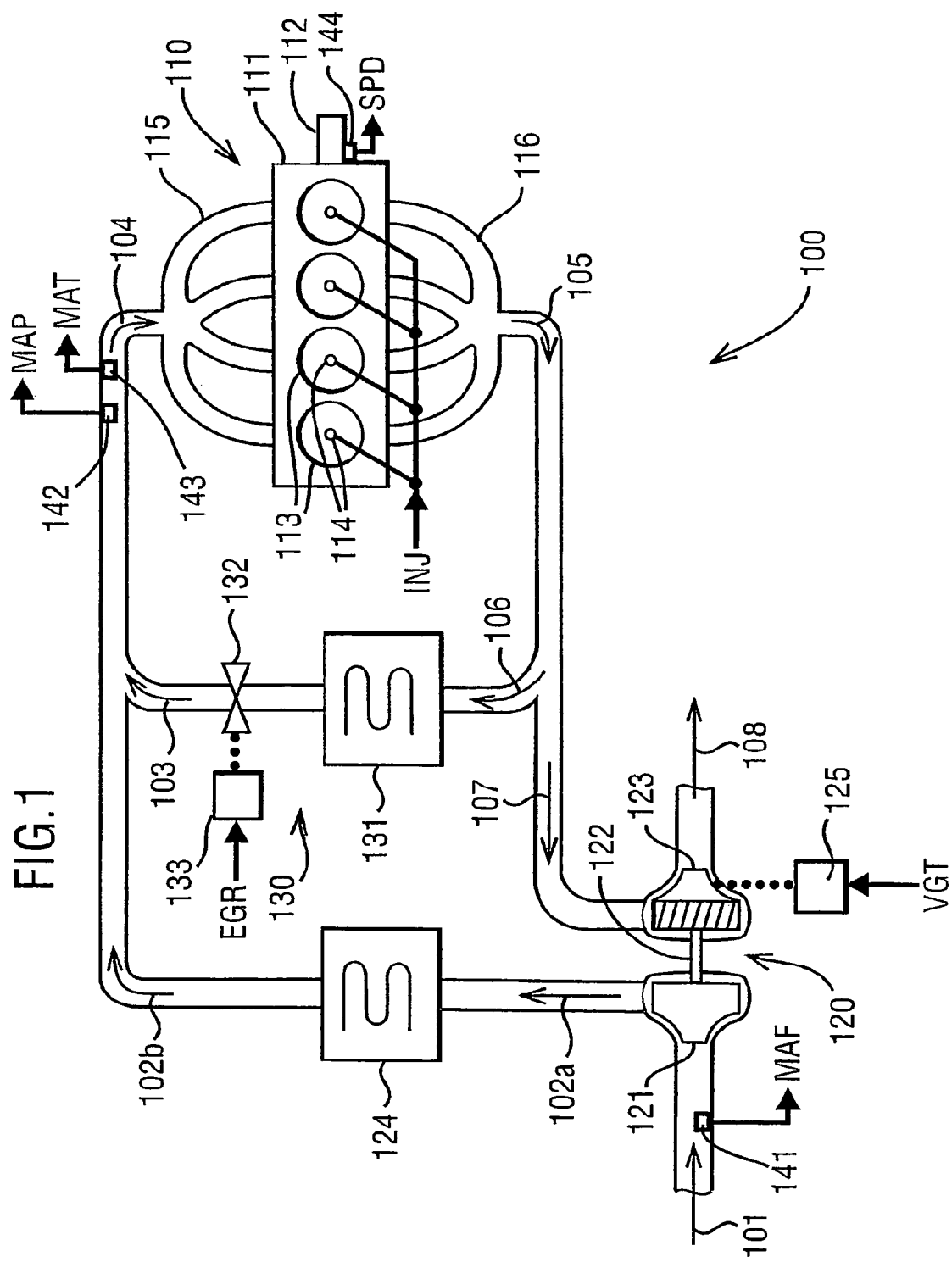
FIG. 1 is a diagram of the principal components of a Diesel engine equipped with a VGT and EGR.

FIG. 1 shows the principal components of a Diesel engine 100 to which the invention may be applied. The Diesel engine 100 is used as part of a vehicle (not shown) and comprises an engine block 110, a VGT 120, an EGR system 130 and sensors 141 to 143.

Clean air 101 is drawn into the compressor 121 of the VGT 120 and the compressed air 102a is then cooled by an intercooler 124. A mass air flow sensor 141 positioned in the inlet duct to the compressor 121 measures the mass air flow of the clean air 101 in kilograms per second and produces an output signal MAF. The intercooler 124 cools the compressed air 102a with the result that the density of the intercooled air 102b is increased. It is desirable that the intercooled air 102b should have a high density as this allows a greater mass of air to be induced into the engine block 110. The intercooled air 102b from the intercooler 124 forms part of the inlet manifold air 104 that is admitted into the engine block 110 via an inlet manifold 115. The pressure of the inlet manifold air 104 as it enters the inlet manifold 115 is measured by a pressure sensor 142 which produces a signal MAP indicative of the manifold air pressure. The temperature of the inlet manifold air 104 as it enters the inlet manifold 115 is measured by a temperature sensor 143 which produces a signal MAT indicative of the manifold air temperature.

The engine block 110 comprises a cylinder block 111 which has four cylinders 113, each cylinder 113 housing a respective piston (not shown). The pistons are connected to a crankshaft 112, the speed of which is measured by a speed sensor 144 which produces a signal SPD indicative of the angular velocity of the crankshaft 112. Each cylinder 113 is provided with a respective fuel injector 114 and the fuel injectors 114 are actuated by a signal INJ. The inlet manifold 115 is bolted to one face of the cylinder block 111 whilst an exhaust manifold 116 is bolted to the opposite face of the cylinder block 111 and serves to duct exhaust manifold gas 105 out of the four cylinders 113 of the engine block 110.

The exhaust manifold gas 105 is split into two streams, EGR gas 106 and turbine gas 107. The EGR gas 106 passes through an EGR intercooler 131 which increases the density of the intercooled EGR gas 103. The intercooled EGR gas 103 mingles with the intercooled air 102b to form the inlet manifold air 104. The proportion of intercooled EGR gas 103 in the inlet manifold air 104 is controlled by an EGR valve 132. The position of the EGR valve 132 is controlled by an EGR actuator 133 in response to a signal EGR.

The turbine gas 107 passes through a set of turbine stator blades (not shown) and through a turbine 123 to form exhaust gas 108. The turbine 123 is mounted on a common shaft 122 with the compressor 121 and thus some of the energy of the turbine gas 107 is used to compress the clean air 101. The exhaust gas 108 is passed through a silencer (not shown).

The angle of the turbine stator blades may be varied by a VGT actuator 125 in response to a signal VGT. The pressure drop across the turbine 123, and hence the energy extracted from the turbine gas 107, may be varied by changing the angle of the turbine stator blades.

Figure 2:
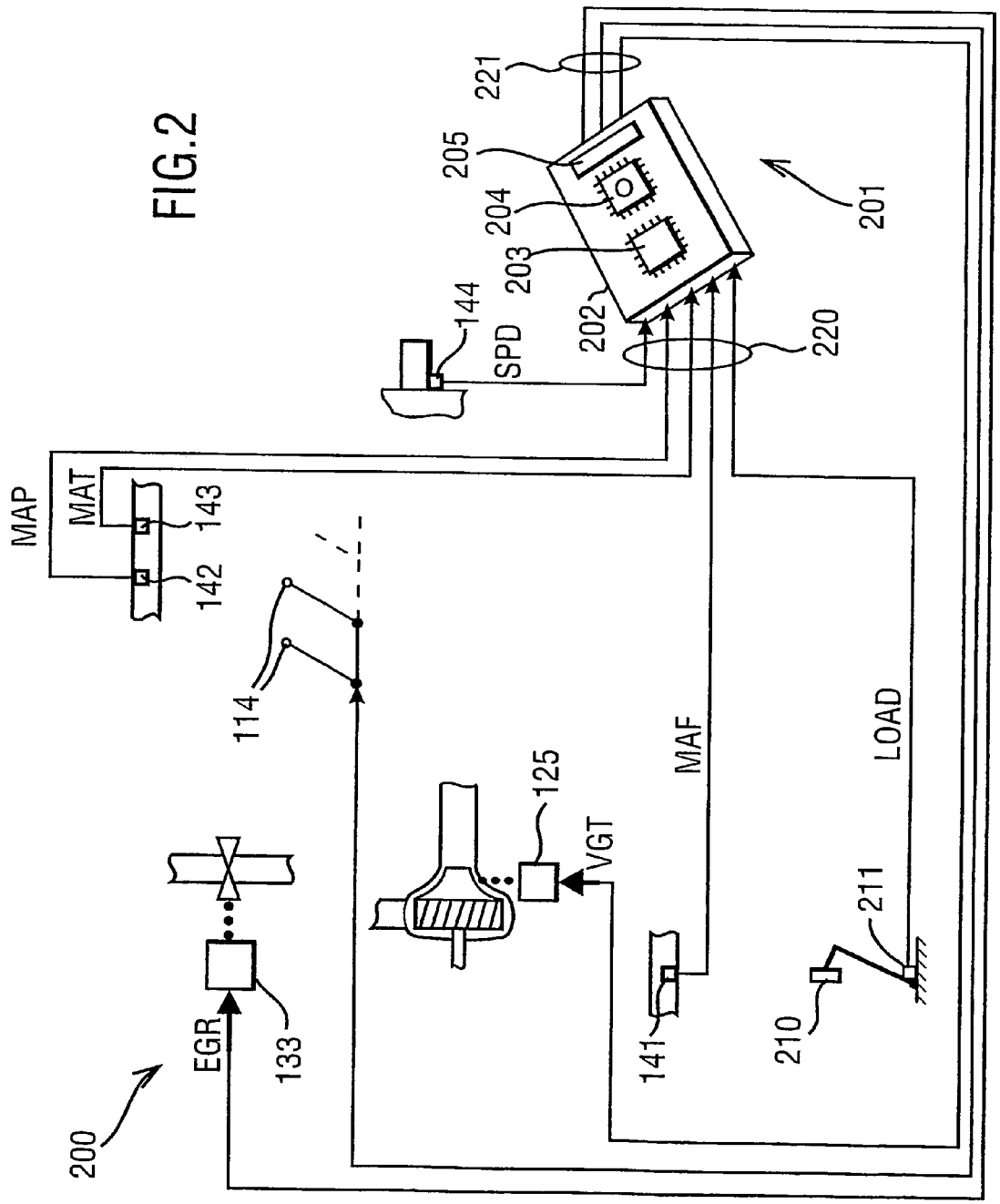
FIG. 2 is an isometric view of a controller for the Diesel engine of FIG. 1 and also shows schematic views of the sensors and actuators connected to the controller.

FIG. 2 shows a control system 200 for controlling the Diesel engine 100. The control system 200 comprises a controller 201 which receives input signals 220 from the sensors and which produces output signals 221, in response to the input signals 220, to drive various actuators.

The controller 201 is shown in an isometric view and comprises a printed circuit board (PCB) 202 for interconnecting, and on which are mounted, a microprocessor 203, having integrated random access memory (RAM), and a read only memory (ROM) 204. The ROM 204 contains a program consisting of a sequence of instructions for the microprocessor 203. The controller 201 also comprises drive circuitry 205 which produces signals of sufficient current and voltage to operate the various actuators.

The input signals 220 comprise SPD, MAP, MAT, MAF and LOAD. The LOAD signal is produced by a position sensor 211 in response to the position of a pedal 210 and controls the amount of fuel which is injected into the cylinders 113 by the fuel injectors 114. The driver of the vehicle positions the pedal 210 to control the speed and acceleration of the car. The load of the Diesel engine 100 corresponds to the power demanded from it and thus to the mass flow rate, in kilograms per second, of fuel into the engine block 110.

The input signals 220 are analogue and are therefore digitised by analogue to digital convertors (ADCs) (not shown) so that the digitised signals can be processed by the microprocessor 203. In this embodiment the ADCs have a resolution of 8 bits.

The output signals 221 are VGT, EGR and INJ and these control, respectively, the VGT actuator 125, the EGR actuator 133 and the fuel injectors 114.

The VGT and EGR signals are digital and are therefore converted to analogue signals by digital to analogue convertors (DACs) (not shown) before being passed to their respective actuators. In this embodiment the DACs have a resolution of 8 bits.

The controller 201 produces in a conventional manner the INJ signal to control the fuel injectors 114 in dependence upon the signals LOAD and SPD. Note that the signal SPD also indicates when the pistons are at top-dead-centre so that fuel injection may be performed at the appropriate time with respect to the angular position of the crankshaft 112.

Figure 3:
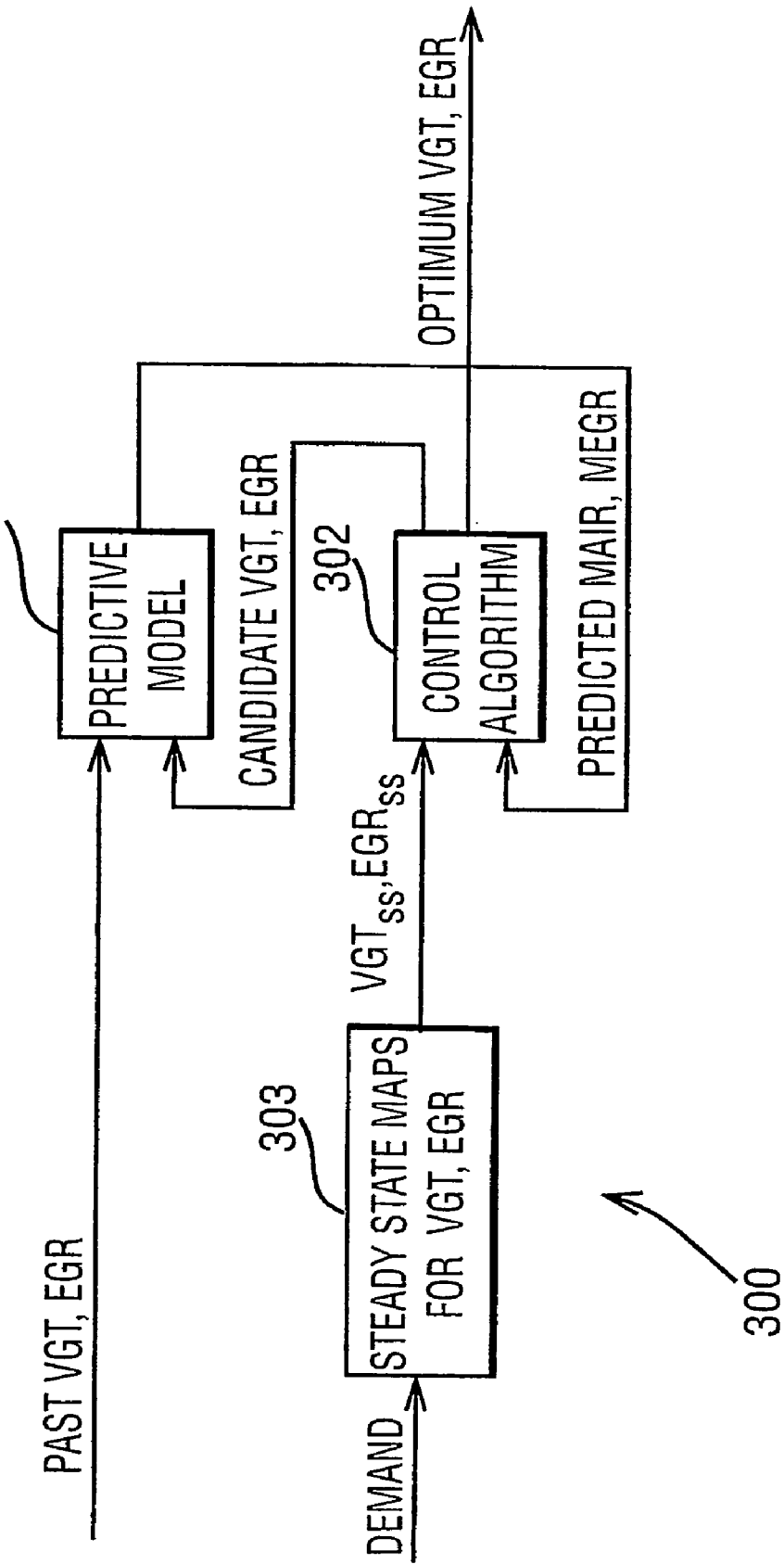
FIG. 3 is a block diagram showing how new settings for the VGT and EGR are arrived at using a predictive model, steady-state maps and a control algorithm.

FIG. 3 shows a simplified block diagram of the functionality of the controller 201. The microprocessor 203, under the direction of the program stored in the ROM 204, embodies a predictive model 301, a control algorithm 302 and a steady state map 303.

The steady state map 303 contains two look-up tables with optimised values, $VGT_{ss}$ and $EGR_{ss}$, for the VGT and EGR actuators 125, 133 for a variety of steady state engine speeds and loads. $VGT_{ss}$ and $EGR_{ss}$ for intermediate engine speeds and loads are determined by interpolation. As discussed later, the $VGT_{ss}$ and $EGR_{ss}$ values are determined by empirically testing the Diesel engine 100 and adjusting the VGT and EGR settings until, for each speed and load combination, fuel efficiency has been maximised and PM and $NO_x$ emissions have been minimized. However, when the speed and/or load are changing then $VGT_{ss}$ and $EGR_{ss}$ may no longer be optimum. For example, if the driver of the vehicle suddenly pushes the pedal 210 then the amount of fuel injected into the engine block 110 will suddenly increase whereas the mass flow rate of inlet manifold air 104 into the engine block 110 will take longer to achieve a corresponding increase (due to factors such as turbo lag). Until the air flows of the intercooled air 102b and the intercooled EGR gas 103 have responded and settled to the new $VGT_{ss}$ and $EGR_{ss}$ settings necessitated by the movement of the pedal 210, the AFR will drop below 25 resulting in a transient puff of smoky exhaust containing PM emissions.

The control algorithm 302 uses the predictive model 301 to anticipate the response of the engine 100 to the transient conditions and to the revised $VGT_{ss}$ and $EGR_{ss}$ settings. This allows the controller 302 to consider the effects of modifying the $VGT_{ss}$ and $EGR_{ss}$ values in order to minimise the deviation of the AFR from 25 during the course of the transient. Conversely, if the speed and/or load are varying slowly then the control algorithm 302 will only make small, if any, changes to the $VGT_{ss}$ and $EGR_{ss}$ values suggested by the steady state map 303.

The predictive model 301 predicts the mass flow rate, MAIR, of intercooled air 102b into the inlet manifold 115 and also the mass flow rate, MEGR, of intercooled EGR gas 103 into the inlet manifold 115. Future values of MAIR and MEGR are predicted on the basis of the recent past positions of the VGT and EGR actuators 125, 133 and of the recently measured values of MAIR and MEGR.

The control system 300 operates at discrete timesteps of 60 ms. At each timestep the control system 300 takes into account the current speed and load demanded of the engine, and the recent past history of the positions of the VGT and EGR actuators 125, 133 to arrive at VGT and EGR signal values which will be used at the next timestep to update the positions of the VGT and EGR actuators 125, 133. This process is repeated every 60 milliseconds (60 ms is the interval between consecutive timesteps) and the VGT and EGR values computed at the previous timestep are used as the most recent values of the past history of the positions of the VGT and EGR actuators 125, 133.

The MAIR and MEGR predicted by the model 301 themselves depend upon the candidate VGT and EGR values being evaluated by the algorithm 302. This is because the current VGT and EGR values under consideration will affect the future airflow around the Diesel engine 100, and since the optimum VGT and EGR values depend on the future airflow, there is considerable interaction between the predicted MAIR and MEGR values and VGT and EGR values.

Due to this interaction, several iterations of candidate VGT and EGR values, and predicted MAIR and MEGR values, may be required at each timestep until the model 301 and the algorithm 302 converge on the anticipated optimum VGT and EGR values. Note that the controller 201 does not have any information as to the future speed and load of the Diesel engine 100 and it therefore assumes that the current speed and load will be maintained indefinitely. If the speed and/or load do change then this will be taken into consideration at the next timestep.

An advantage of the control system 300 is that it allows the integration of optimised steady state information regarding the Diesel engine 100 with the predicted response to changes of the engine speed and/or load.

Figure 4:
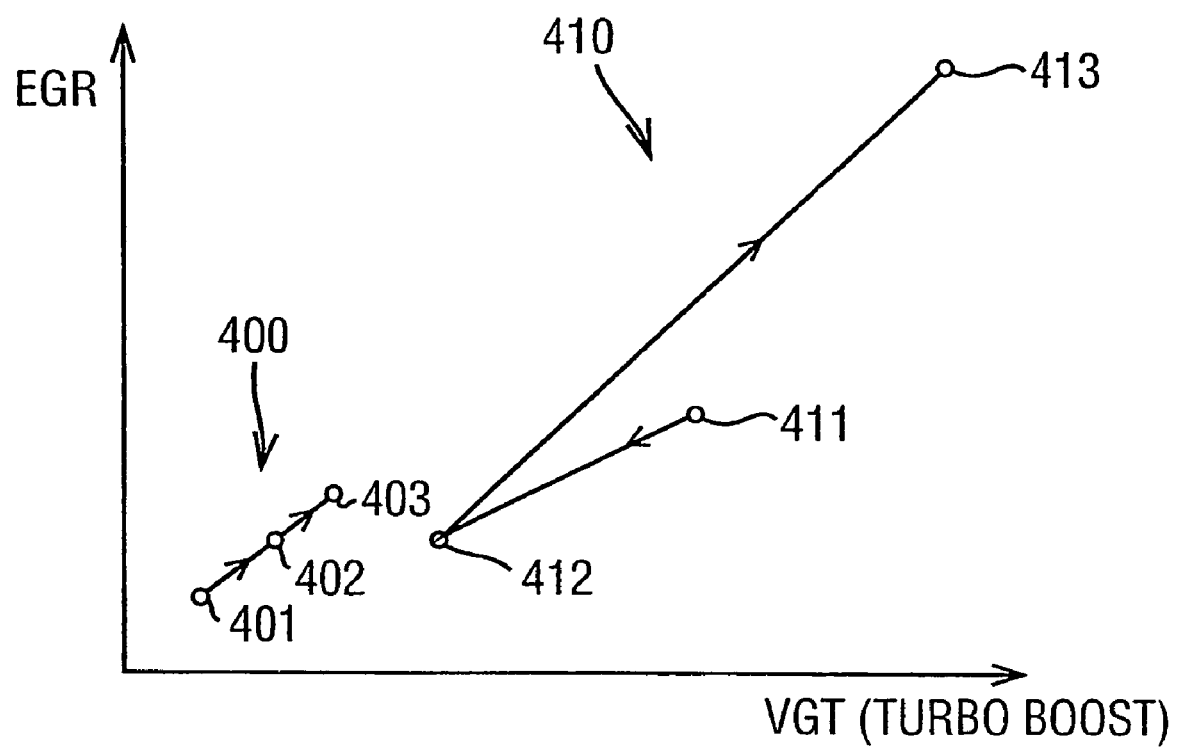
FIG. 4 is a diagram showing the response of the controller of FIG. 2 to an increased engine load under two different rates of increase.

FIG. 4 shows two examples 400, 410 of the response of the control system 300. Example 400 is essentially under steady state conditions whilst example 410 is under highly dynamic conditions. The two examples 400, 410 each show three consecutive combinations of the VGT and EGR actuator positions. In each of the examples, the combinations are separated by an interval of 0.48 s, i.e. by 8 timesteps.

As can be seen, the combinations 401, 402 and 403 of example 400 lie relatively close together which indicates that the speed and/or load of the Diesel engine 100 has changed only slightly during the consecutive 0.48 s time intervals. The VGT and EGR actuator 125, 133 positions are substantially those recommended by the steady state map 303 with only a slight perturbation due to the interaction between the predictive model 301 and control algorithm 302.

Example 410, which comprises combinations 411, 412 and 413, shows the effect of a rapid increase in the load of the engine. The rapid increase in the load is applied just after combination 411 and requires a corresponding increase in the amount of air induced into the engine in order to maintain the AFR at about 25. Prior art controllers would typically increase the VGT actuator 125 setting in order to raise the pressure of the intercooled air 102b and hence raise the amount of air induced into the engine block 110. However, in the short term, increasing the VGT actuator 125 setting actually reduces the power developed by the engine, which conflicts with the driver's demand for more power. This power reduction occurs because increasing the VGT actuator 125 setting raises the back pressure (i.e. the pressure of the exhaust manifold gas 105) which reduces the efficiency of the engine and also causes more intercooled EGR gas 103 to pass through the EGR valve 132. The increased levels of EGR reduce the amount of oxygen available in the cylinders 113 to burn the fuel and so further reduce both the AFR and the power developed by the Diesel engine 100.

In contrast, the control system 300 initially causes a short term reduction of the VGT signal in order to reduce the back pressure of the exhaust manifold gas 105. This reduction in back pressure also causes a reduction in the pressure drop across the turbine 123 with the result that the speed of the VGT 120 starts to decrease. However, the rotational kinetic energy of the VGT 120 is such that, in the short term, it will continue to compress the clean air 101. Combination 412 shows that the VGT and EGR actuator 125, 133 settings have been reduced from those at combination 411.

By the time of combination 413, 0.96 s after combination 411, the power developed by the engine has increased sufficiently to allow the VGT actuator 125 setting to be increased in order to increase the speed, and hence compression, of the VGT 120. Also, to compensate for the increased mass of intercooled air 102b now flowing into the engine 110, the EGR actuator 133 setting is increased so that the AFR is maintained substantially at 25.

Figure 5:
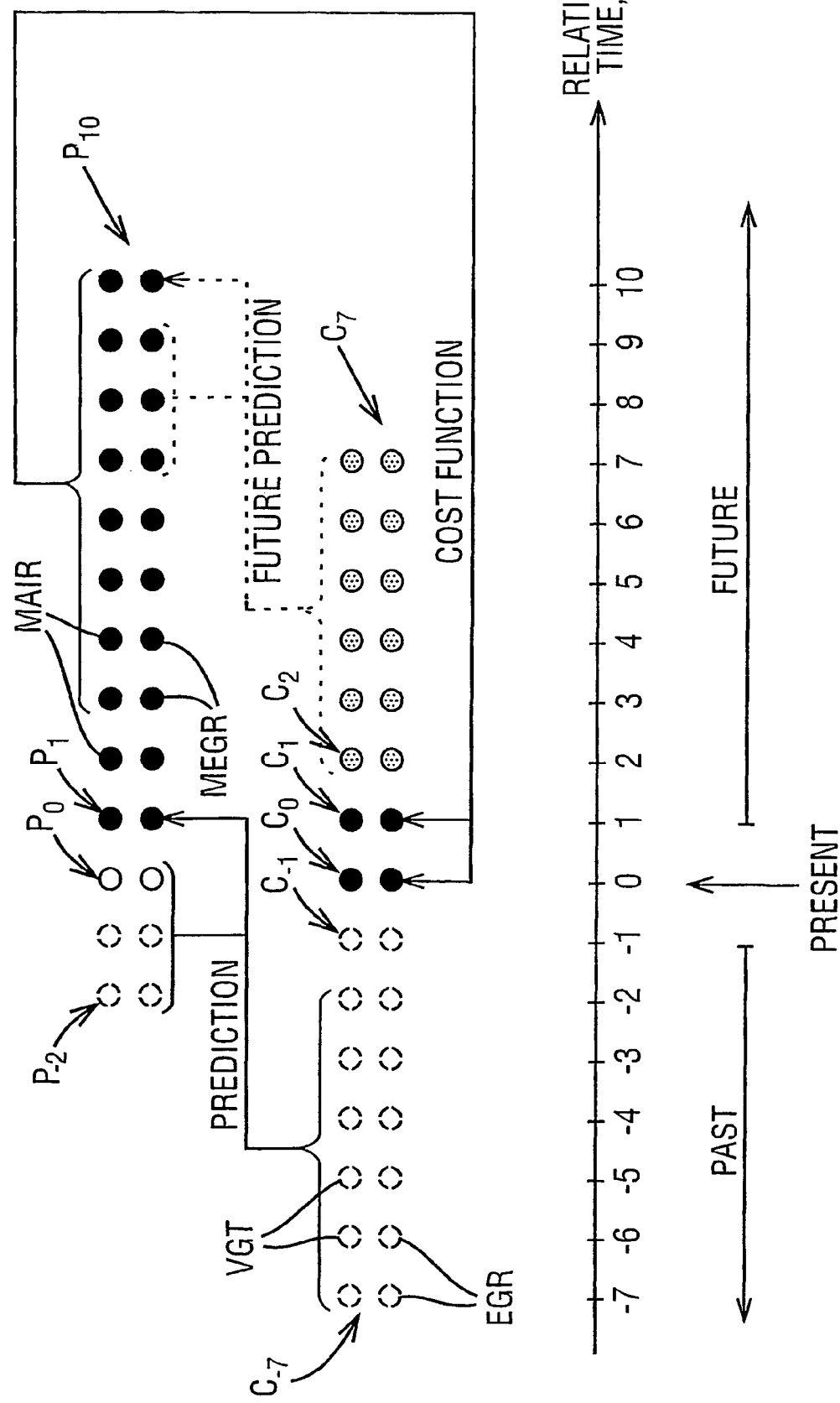
FIG. 5 shows the inter-relationship between the values predicted by the predictive model and cost functions computed by the control algorithm.

FIG. 5 shows the inter-relationship between the past values of VGT and EGR used by the predictive model 301, the values of MAIR and MGER predicted by the model 301, and potential settings for the VGT and EGR actuators 125, 133 that are under consideration by the control algorithm 302. Past values are represented by dashed hollow circles, present values are represented by hollow circles, and future values (including the values for VGT and EGR for the current timestep that are being considered by the algorithm 302) are represented by shaded (some partially, some fully) circles. $P_{-2}$ to $P_{10}$ refer to values concerned with MAIR and MEGR prediction whilst $C_{-7}$ to $C_{-7}$ refer to values concerned with VGT and EGR control. For $P_{-2}$ to $P_{10}$, the upper circles indicate values of MAIR whilst the lower circles indicate values of MEGR. For $C_{-7}$ to $C_{-7}$, the upper circles indicate values of VGT whilst the lower circles indicate values of EGR.

The horizontal axis shows time, relative to the present, divided into the 60 ms steps used by the control system 300. The axis ranges from time t=−7 (420 ms in the past) to time t=10 (600 ms in the future). t=0 represents the present timestep although, of course, in 60 ms time the timestep (t=1) that is currently 60 ms in the future will become the present timestep (t=0).

$P_o$ refers to the values of MAIR and MEGR measured at time t=0. $P_{-2}$ to $P_{10}$ refer to the past, and predicted, values from t=−2 to t=10, respectively. $C_{-7}$ to $C_{-1}$ refer to past VGT and EGR positions from t=−7 to t=−1, respectively. $C_0$ refers to candidate values for VGT and EGR at t=0 under consideration by the algorithm 302.

Although $C_0$ candidate valves are evaluated for timestep t=0, the optimum $C_0$ value is not actually used to update the VGT and EGR actuators 125, 133 until t=1. $C_0$ is termed "$C_0$" as it is based on the information (such as $P_0$) available at t=0; similarly $C_{-1}$ is based on the information available at t=−1 but is actually used to update the VGT and EGR actuators 125, 133 at t=0. The 60 ms latency between information becoming available and the response is inherent in a sampled system with discrete timesteps of 60 ms.

$C_1$ refers to candidate values for t=1 (i.e. based on the state predicted at t=0 of the engine 100 at t=1) which will not be sent to the VGT and EGR actuators 125, 133 but which are nonetheless evaluated at t=0. Typically, several different alternatives for $C_0$ and $C_1$ will be evaluated at each timestep. Although only the optimum $C_0$ candidate is used to update the VGT and EGR actuators 125, 133 at time t=1, by considering the consequential effects of $C_1$ candidates on the $C_0$ candidates ($C_1$ candidates affect the future airflow around the Diesel engine 100 and this influences the suitability of $C_0$ candidates), the algorithm 302 can take account of its own predicted actions to further improve the regulation of the AFR. The reason why $C_1$ candidates are not used to update the VGT and EGR actuators 125, 133 is that, 60 ms in the future i.e. at t=1, what is regarded as $C_1$ by the present timestep (at t=0) will be regarded as $C_0$ by the new timestep and so what is currently $C_1$ will then be recalculated at the new timestep (taking into account its effect on the timestep that is currently 120 ms in the future).

The predictive model 301 calculates $P_1$ by taking $P_{-2}$ to $P_0$ as initial conditions of MAIR and MEGR and by using $C_{-7}$ to $C_{-2}$ to calculate the change in MAIR and MEGR from $P_0$ to $P_1$. Similarly, $P_2$ is calculated from $P_1$ using $P_{-1}$ to $P_1$ as initial conditions and $C_{-6}$ to $C_{-1}$. $P_3$ and $P_4$ are calculated equivalently except that these predictions require knowledge of the $C_0$ and $C_1$ candidates being evaluated by the current timestep. $P_5$ to $P_{10}$ are also calculated equivalently except that these predictions require knowledge of $C_2$ to $C_7$ whereas the algorithm 302 does not consider potential candidates beyond $C_1$ (the computational effort of considering $C_2$ to $C_7$ would be prohibitive and would not justify the improvement in control performance). Therefore for convenience $C_2$ to $C_7$ are all assumed by the predictive model 301 to be identical to $C_1$ and hence $C_2$ to $C_7$ are shown partially shaded in FIG. 5 to denote their dependence upon $C_1$.

However, the predictive model 301 presents the difficulty that the optimised value of $C_0$ can only be calculated once $P_1$ to $P_{10}$ have been established yet the establishment of $P_1$ to $P_{10}$ requires knowledge of the optimised values of $C_0$ and $C_1$. As is discussed later, an iterative approach is used to obtain a substantially optimal $C_0$.

The control algorithm 302 evaluates the suitability of a candidate $C_0$ by considering its effects on the AFR from t=3 to t=10, i.e. using $P_3$ to $P_{10}$. The reason why the effects of $C_0$ are not considered for $P_0$ to $P_2$ is that the VGT and EGR actuators 125, 133 take time to move to their new settings and that the airflow around the Diesel engine 100 also takes time to respond to the new VGT and EGR 125, 133 actuator settings. Thus there is no benefit in considering the effect of a candidate $C_0$ on $P_0$ to $P_2$. Conversely, the accuracy of predictions beyond t=10, does not justify the extra computational effort of predicting values beyond $P_{10}$.

Similarly, the positions of the VGT and EGR actuators 125, 133 prior to t=−7 are not considered when calculating $P_1$ because the airflow around the Diesel engine 100 depends upon the recent past whereas information from before t=−7 is too old to be of significant relevance to $P_1$. Therefore, $C_{-1}$ and $C_0$ are not considered when calculating $P_1$ due to the response time of the flow of air/gas around the Diesel engine 100.

Figure 6:
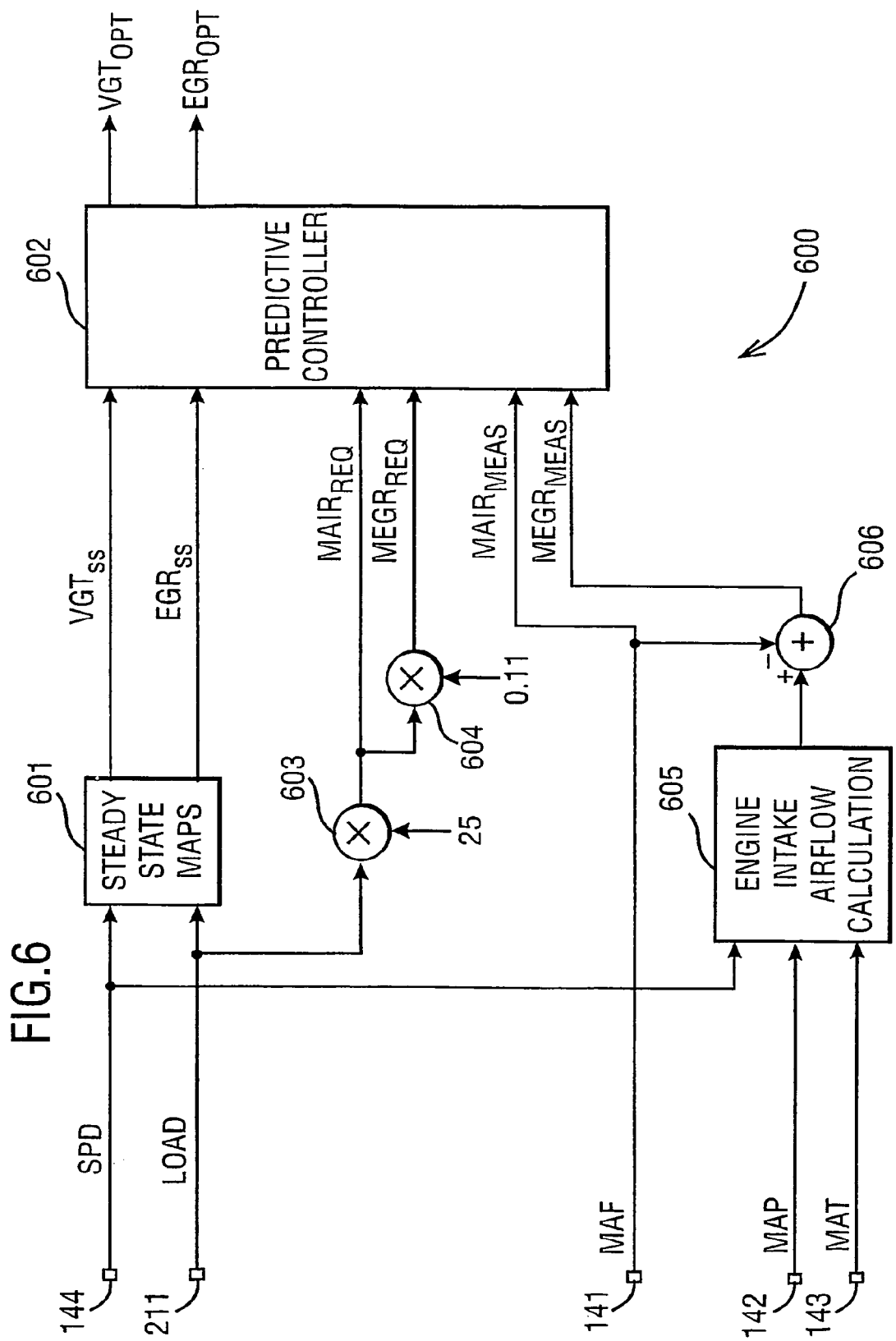
FIG. 6 is a more detailed block diagram of FIG. 3 and shows steady state maps, an airflow calculator and a predictive controller.

FIG. 6 shows a block diagram 600 of the functionality of the controller 201. As will become apparent, the functionality discussed in relation to FIG. 3 is a subset of that shown in FIG. 6. Note that no details associated with fuel injection are shown as this is conventional.

The signal SPD from the speed sensor 144 and the signal LOAD from the position sensor 211 are used as inputs by the steady state maps 601 to look up, from look-up tables, the optimum steady state settings, designated $VGT_{ss}$ and $EGR_{ss}$, for the VGT and EGR actuators 125, 133, respectively. At each timestep, the current $VGT_{ss}$ and $EGR_{ss}$ are used by a predictive controller 602 to arrive at substantially optimal VGT and EGR settings. The predictive controller 602 has two outputs, $VGT_{OPT}$ and $EGR_{OPT}$, and every 60 ms it updates these outputs with the new optimal values for the VGT and EGR actuators 125, 133.

The signals SPD and LOAD are also used by a multiplier 603 to calculate the mass flow rate, $MAIR_{REQ}$, of air that is required to maintain the AFR at 25. The signal LOAD indicates the amount of fuel, in kilograms, injected per injection and this is multiplied by the signal SPD to arrive at the rate, in kilograms per second, at which fuel is being admitted into the engine block 110. This rate is multiplied by 25 to give $MAIR_{REQ}$. $MAIR_{REQ}$ forms an input to the predictive controller 602 and is also passed to a multiplier 604 which multiplies $MAIR_{REQ}$ by 0.11 to form a signal $MEGR_{REQ}$. $MEGR_{REQ}$ also forms an input to the predictive controller 602 and indicates the mass flow rate of intercooled EGR gas 103 that is required if 10% of the inlet manifold air 104 is to be composed of intercooled EGR gas 103.

The signal MAF from the mass air flow sensor 141 forms another input to the predictive controller 602 and this measured signal will hereinafter, for consistency with the other inputs to the predictive controller 602, be termed $MAIR_{MEAS}$.

A further signal $MEGR_{MEAS}$ forms another input to the predictive controller 602 and indicates the measured mass flow rate of intercooled EGR gas 103 into the engine block 110. $MEGR_{MEAS}$ is not directly measured but is calculated from other measurements by an engine intake airflow calculator 605 and by a subtractor 606. The airflow calculator 605 uses the MAP signal from the pressure sensor 142 and the MAT signal from the temperature sensor 143 to calculate the density, in kg per $m^3$, of the inlet manifold air 104. The airflow calculator 605 also calculates the volumetric flow rate, in $m^3$ per second, of the inlet manifold air 104 into the engine block 110. The volumetric flow rate is calculated by multiplying the effective volume (when it is inducing inlet manifold air 104) of a cylinder 113 by the number of inductions per second. The number of inductions per second is proportional to the SPD signal from the speed sensor 144. Thus the airflow calculator 605 produces a signal $MINLET_{MEAS}$ indicative of the mass flow rate, in kg per second, of inlet manifold air 104 into the engine block 110. The subtractor 606 subtracts $MAIR_{MEAS}$ from $MINLET_{MEAS}$ to give $MEGR_{MEAS}$.

Thus the predictive controller 602 has information regarding the optimised steady state VGT and EGR settings, the demanded air flows and the actual air flows. From this it can calculate substantially optimal settings that combine the steady state information with the actual (transient) operating conditions.

Figure 7:
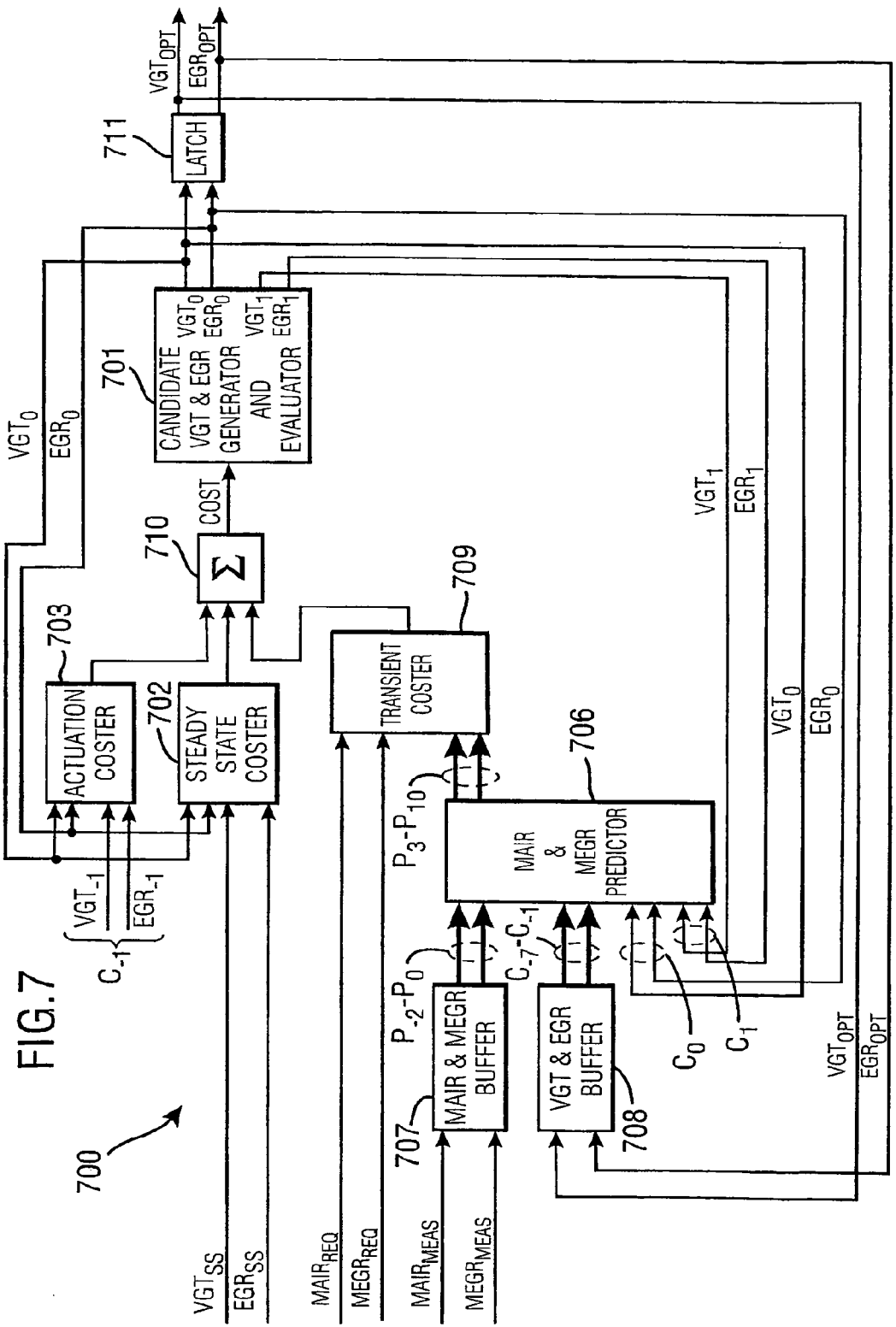
FIG. 7 is a block diagram of the predictive controller.

FIG. 7 shows a block diagram 700 of the predictive controller 602. Principal components shown by the block diagram 700 include a value generator 701, for generating candidate values of VGT and EGR, a predictor 706, for predicting MAIR and MEGR, and three blocks 702, 703, 709 for determining the "cost" of $C_o$ candidates. Thickened lines are used in FIG. 7 to denote buses comprising several related signals.

As is discussed later in more detail, the suitability of the VGT and EGR values of $C_o$ candidates is assessed by associating a cost therewith. The $C_o$ candidate with the lowest cost is selected for output to the VGT and EGR actuators 125, 133. A steady state coster 702 penalises any deviation of the candidate VGT, EGR values away from the $VGT_{ss}$ and $EGR_{ss}$ values of the steady state maps 601. An actuation coster 703 penalises any movement of the VGT and EGR actuators 125, 133. The actuation coster 703 provides the generator 701 with an incentive to minimise actuator movements and this has the long term effect of reducing wear and tear of the VGT and EGR actuators 125, 133, thus improving the reliability of the Diesel engine 100. A transient coster 709 penalises any deviation of the predicted MAIR and MEGR (which depend on the $C_o$ candidate selected) from the demanded $MAIR_{REQ}$ and $MEGR_{REQ}$, and thus penalises any deviation of the AFR and EGR proportion away from 25 and 0.1, respectively.

The generator 701 has two outputs, $VGT_0$ and $EGR_0$, which are the VGT and EGR values of the current $C_o$ candidate. $VGT_0$ and $EGR_0$ are taken to the steady state coster 702 which calculates their differences from $VGT_{ss}$ and $EGR_{ss}$, respectively, and then squares both the differences. The squared differences are then added together and taken to form one of three inputs of a summer 710.

$VGT_0$ and $EGR_0$ are also passed to the actuation coster 703 which subtracts $VGT_{-1}$ and $EGR_{-1}$ (the optimised VGT and EGR values from the previous timestep, 60 ms ago), in order to determine how far the current $C_0$ candidate requires the VGT and EGR actuators 125, 133 to move from their previous positions. The actuation coster 703 squares both of these differences and the squared differences are then added together and taken to the second input of the summer 710.

A buffer 707 buffers the $MAIR_{MEAS}$ and $MEGR_{MEAS}$ values from the two previous timesteps and passes these, together with the measured values for the current timestep, to the predictor 706. Thus the values passed to the predictor 706 by the buffer 707 correspond to $P_{-2}$ to $P_0$ as shown in FIG. 5.

A buffer 708 stores recent previous $VGT_{OPT}$ and $EGR_{OPT}$ values to form a past history of the positions of the VGT and EGR actuators 125, 133. The past history comprises $C_{-7}$ to $C_{-1}$ and this information is passed to the predictor 706. The VGT and EGR values from the buffer 708 correspond to $C_{-7}$ to $C_{-1}$ shown in FIG. 5. $C_{-7}$ to $C_{-2}$ are used to calculate $P_1$; $C_{-1}$ is included for the calculation of $P_2$. The generator 701 also has two outputs, $VGT_1$ and $EGR_1$, which are the VGT and EGR values of the current $C_1$ candidate. The predictor 706 also receives $VGT_0$, $EGR_0$, $VGT_1$ and $EGR_1$ i.e. the $C_0$ and $C_1$ candidates under evaluation by the generator 701.

Using $C_{-7}$ to $C_1$ (and, by implication, $C_2$ to $C_7$) and $P_{-2}$ to $P_0$, the predictor 706 predicts values of MAIR and MEGR for timesteps t=1 to t=10. The predicted values for timesteps t=3 to t=10 are designated $MAIR_3$ to $MAIR_{10}$ and $MEGR_3$ to $MEGR_{10}$, respectively. As shown, $P_3$ to $P_{10}$ are passed to the transient coster 709. Only $P_3$ to $P_{10}$ are passed to the coster 709 as the response time of the air flow around the Diesel engine 100 is such that there is no benefit in calculating costs for $P_1$ and $P_2$. The transient coster 709 determines, for each of $P_3$ to $P_{10}$, the difference between $MAIR_{REQ}$ and $MEGR_{REQ}$ and the corresponding predicted MAIR and MEGR values. Thus the transient coster 709 forms a total of 16 differences. These differences are individually squared and then added together to form a cost which is passed to the summer 710. The cost indicates the discrepancy (if any) between the values of MAIR and MEGR that are predicted to occur and the values of MAIR and MEGR that are required as a consequence of the position of the pedal 210.

The summer 710 adds together the costs from the actuation coster 703, the steady state coster 702 and the transient coster 709 and feeds the result back to the generator 701. The generator 701 typically generates several different candidates for $C_0$ and for $C_1$ and compares the costs from the summer 710 in order to select the $C_0$ having the lowest cost. The lowest cost $C_0$ is allowed to update a latch 711 to give the $VGT_{OPT}$ and $EGR_{OPT}$ values used by the VGT and EGR actuators 125, 133. The optimum $C_0$ is also passed to the actuation coster 703 and to the buffer 708 where it is stored for use, during the next timestep, as $C_{-1}$.

In summary, at each 60 ms timestep, the generator 701 generates various $C_0$ and $C_1$ candidate pairs and the predictor 706 predicts the future airflow for each pair. Even though the $C_1$ values are not costed, they are generated so that the predictor 706 can take into account the effects on the airflow of what are likely to be $C_0$ candidates at the next timestep (in 60 ms time). The $C_0$ candidates are then costed (the cost of a $C_0$ depending upon its associated $C_1$) and the optimum $C_0$ candidate used to update the actuators.

The predictor 706 uses a linear model of the MAIR and MEGR characteristics of the Diesel engine 100 and so uses information about the changes in the VGT and EGR actuator 125, 133 settings to calculate the predicted changes in MAIR and MEGR. The change in a value between two consecutive timesteps is calculated by subtracting the value at the earlier timestep from that of the later timestep. Using the differences in the signals at every timestep, rather than their raw values, allows the predictor 706 to be more sensitive to fluctuations than if it used raw MAIR, MEGR, VGT and EGR information. However, as those skilled in the art of signal processing will appreciate, a differencing operation between successive values of a signal is equivalent to taking the differential of that signal. Thus a differencing operation has some similarities to a high pass filter but instead has a gain that increases with frequency. The gain at high frequencies would result in the predictor 706 being excessively influenced by high frequency noise; to counteract this the differenced signals are low pass filtered. In this embodiment a digital low pass filter is used which has a pole pair at 0.8±0j in the Z plane.

Equations (1) to (4) show how the differenced and band pass filtered values of MAIR, MEGR, VGT and EGR are obtained by the predictor 706 for a particular timestep, t.

$$\Delta MAIR_t = MAIR_t - MAIR_{t-1} + 1.6\Delta MAIR_{t-1} - 0.64\Delta MAIR_{t-2} \qquad (1)$$

$$\Delta MEGR_t = MEGR_t - MEGR_{t-1} + 1.6\Delta MEGR_{t-1} - 0.64\Delta MEGR_{t-2} \qquad (2)$$

$$\Delta VGT_t = VGT_t - VGT_{t-1} + 1.6\Delta VGT_{-1} - 0.64\Delta VGT_{t-2} \qquad (3)$$

$$\Delta EGR_t = EGR_t - EGR_{t-1} + 1.6\Delta EGR_{t-1} - 0.64\Delta EGR_{t-2} \qquad (4)$$

As can be seen from inspection of equations (1) to (4), in each equation the difference is found and to this difference are added suitably scaled values of the differences at the two previous timesteps. The addition to the current difference of the scaled two previous differences results in the low pass filtering action. The interaction of the high pass response of the differencing with the low pass response of the digital low pass filter gives an overall band pass response.

Note that although for simplicity it was not mentioned earlier, the buffers 707, 708 also supply the predictor 706 with $C_{-10}$ to $C_{-8}$, so that differenced and filtered $\Delta VGT_{-7}$ and $\Delta EGR_{-7}$ can be calculated, and with $P_{-5}$ to $P_{-3}$, so that differenced and filtered $\Delta MAIR_{-2}$ and $\Delta MEGR_{-2}$ can be calculated. Also not mentioned earlier is that the $VGT_{SS}$, $EGR_{SS}$, $MAIR_{REQ}$, $MEGR_{REQ}$, $MAIR_{MEAS}$, and $MEGR_{MEAS}$ signals are also low pass filtered (but not differenced) using the same type of low pass filter as was used for the MAIR, MEGR, VGT and EGR signals. An advantage of ensuring that all inputs to the predictive controller 602 are filtered is that this avoids the predictive controller 602 attempting to respond to signals which are outside its control bandwidth. For example, the response times of the air flows around the engine 100 are sufficiently slow that it is not necessary for the predictive controller 602 to attempt to change the air flows in response to excessively rapid fluctuations of the LOAD signal.

$\Delta MAIR_n$ and $\Delta MEGR_n$ are calculated using equations (5) and (6):

$$\sum_{i=-3}^{0} \Delta MAIR_{i+n} \mathrm{a\_air}_i = \sum_{i=-8}^{-3} \Delta VGT_{i+n} \mathrm{b\_air\_vgt}_i + \sum_{i=-8}^{-3} \Delta EGR_{i+n} \mathrm{b\_air\_egr}_i \qquad (5)$$

$$\sum_{i=-3}^{0} \Delta MEGR_{i+n} \mathrm{a\_egr}_i = \sum_{i=-8}^{-3} \Delta VGT_{i+n} \mathrm{b\_egr\_vgt}_i + \sum_{i=-8}^{-3} \Delta EGR_{i+n} \mathrm{b\_egr\_egr}_i \qquad (6)$$

and solving for $\Delta MAIR_n$ and for $\Delta MEGR_n$ respectively, where n denotes the number of timesteps in the future. For example, to obtain $\Delta MAIR_6$, 360 ms in the future, n=6.

Equation (5) contains three indexed parameters $\mathrm{a\_air}_i$, $\mathrm{b\_air\_vgt}_i$, $\mathrm{b\_air\_egr}_i$ and equation (6) also contains three sets of indexed parameters, $\mathrm{a\_egr}_i$, $\mathrm{b\_egr\_vgt}_i$ and $\mathrm{b\_egr\_egr}_i$. The way in which the values of these $\mathrm{a\_xxx}_i$ and $\mathrm{b\_xxx\_xxx}_i$ parameters are obtained is discussed later.

The linear model used in equations (5) and (6) to predict $\Delta MAIR_{1-10}$ and $\Delta MEGR_{1-10}$ is an example of an Auto-Regressive Integrated Moving Average (ARIMA) model. Further information on ARIMA models may be found in "System Identification: Theory for the User" by Lennart Ljung, 1987, Prentice-Hall, the contents of which are herein incorporated by reference.

Prediction $P_1$ is obtained from $P_0$ by solving equations (5) and (6) with n=1. n is then increased to 2 and the process repeated to obtain $P_2$, and so on until $P_{10}$ has been obtained. Of course, equations (5) and (6) give $\Delta MAIR_n$ and $\Delta MEGR_n$ but these, for example at timestep t=2, can readily be converted back to un-differenced (though filtered) MAIR and MEGR using equations (7) and (8).

$$MAIR_2 = \Delta MAIR_2 + MAIR_1 = \Delta MAIR_2 + \Delta MAIR_1 + MAIR_{MEAS} \qquad (7)$$

$$MEGR_2 = \Delta MEGR_2 + MEGR_1 = \Delta MEGR_2 + \Delta MEGR_1 + MEGR_{MEAS} \qquad (8)$$

The cost of the current candidate values of $\Delta VGT_0$ and $\Delta EGR_0$ for $C_0$ may then be evaluated. Absolute values for $VGT_0$ and $EGR_0$ can be found using equations (9) and (10).

$$VGT_0 = \Delta VGT_0 + VGT_{-1} \qquad (9)$$

$$EGR_0 = \Delta EGR_0 + EGR_{-1} \qquad (10)$$

The costs for the AFR and EGR, $J_{AIR}$ and $J_{EGR}$, respectively, are evaluated separately and then added together. As can be seen from equations (11) and (12), the cost terms include, respectively, the transient cost, the actuation cost and, finally, the steady state cost.

$$J_{AIR} = k_{a1} \sum_{i=3}^{10} (MAIR_{REQ} - MAIR_i)^2 + k_{a2} \Delta VGT_0^2 + k_{a3}(VGT_0 - VGT_{SS})^2 \qquad (11)$$

-continued $$J_{EGR} = k_{e1} \sum_{i=3}^{10} (MEGR_{REQ} - MEGR_i)^2 + \quad (12)$$
$$k_{e2}\Delta EGR_0^2 + k_{e3}(EGR_0 - EGR_{SS})^2$$

where $k_{a1}$ to $k_{a3}$ ($k_{ax}$) and $k_{e1}$ to $k_{e3}$ ($k_{ex}$) are constants, the significance of which is explained later. The $J_{AIR}$ and $J_{EGR}$ costs are combined, as shown by equation (13), to arrive at the overall cost of the candidate $C_0$ being costed.

$$J = J_{AIR} + J_{EGR} \quad (13)$$

As those skilled in the art will appreciate, the cost function defined by equations (11), (12) and (13) has some similarities to the Generalised Predictive Control (GPC) cost function, further details of which may be found in "Advances in Model-Based Predictive Control", edited by D. W. Clarke, Oxford University Press, UK, 1994, the contents of which are included herein by reference. However, the GPC cost function does not include a cost term associated with the deviation of the candidate away from the steady state values.

Figure 8:
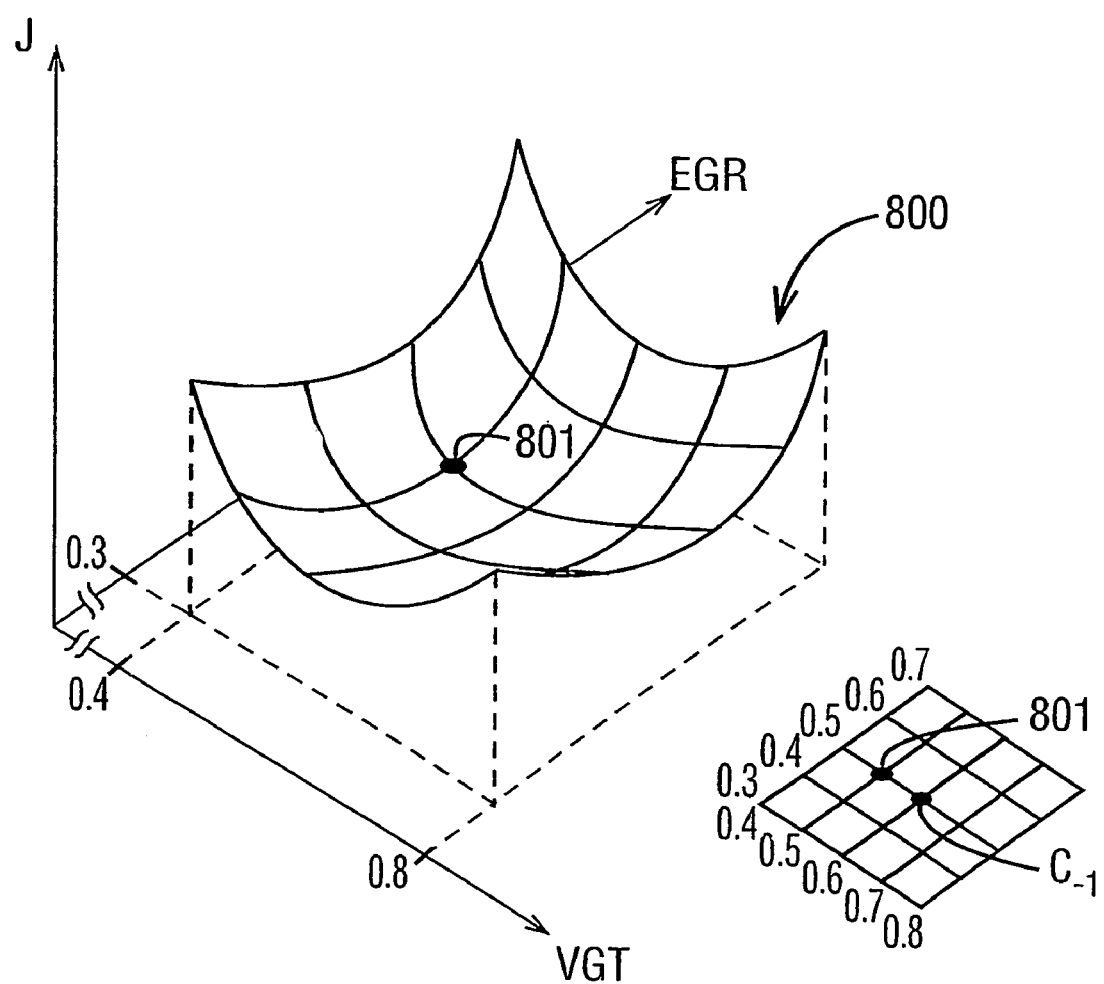
FIG. 8 shows the locus of candidate VGT and EGR actuator positions available for evaluation at a timestep.

FIG. 8 will now be used to explain how the generator 701 generates candidate values of VGT and EGR for $C_0$ and $C_1$ and how it arrives at the $VGT_{OPT}$ and $EGR_{OPT}$ values that are passed to the VGT and EGR actuators 125, 133. FIG. 8 is an exemplary graph showing how the cost, J, of $C_0$ candidates varies with VGT and EGR. There are three orthogonal axes labelled VGT, EGR and J, representing the VGT actuator 125 setting, EGR actuator 133 setting and cost J, respectively. There is shown a surface 800 consisting of a 5×5 array of $C_0$ candidates, centred on $C_{-1}$.

The reason why there are 25 $C_0$ candidates is due to the resolution and response time of the VGT and EGR actuators 125, 133 used in this embodiment. Both actuators have a normalised full scale range of 0 to 1 with a resolution of 0.1. Thus the allowable VGT and EGR values are 0, 0.1, 0.2, ..., 1. The response time of the actuators is such that they can move by up to ±0.2 of the full scale range in a 60 ms timestep. $C_{-1}$ in FIG. 8 has VGT, EGR co-ordinates of 0.6, 0.5, respectively, and therefore the $C_0$ candidates that may be validly considered have VGTs in the range 0.4 to 0.8 and EGRs in the range 0.3 to 0.7. For each of the 25 $C_0$ candidates there are 25 $C_1$ candidates and, similarly, a valid $C_1$ candidate may lie up to ±0.2 away from its $C_0$. Thus the total loci of $C_1$ candidates has VGTs in the range 0.2 to 1 and EGRs in the range 0.1 to 0.9.

At each timestep, the generator 701 generates all 625 permutations of $C_0$ and $C_1$ candidates and the predictor 706 and transient coster 709 cost each permutation. The steady state coster 702 and the actuation coster 703 calculate their respective costs for each of the 25 $C_0$ candidates. The optimum $C_0$ 801 is that of whichever permutation offers the lowest cost and, as shown, has a VGT of 0.5 and an EGR of 0.5.

Figure 9:
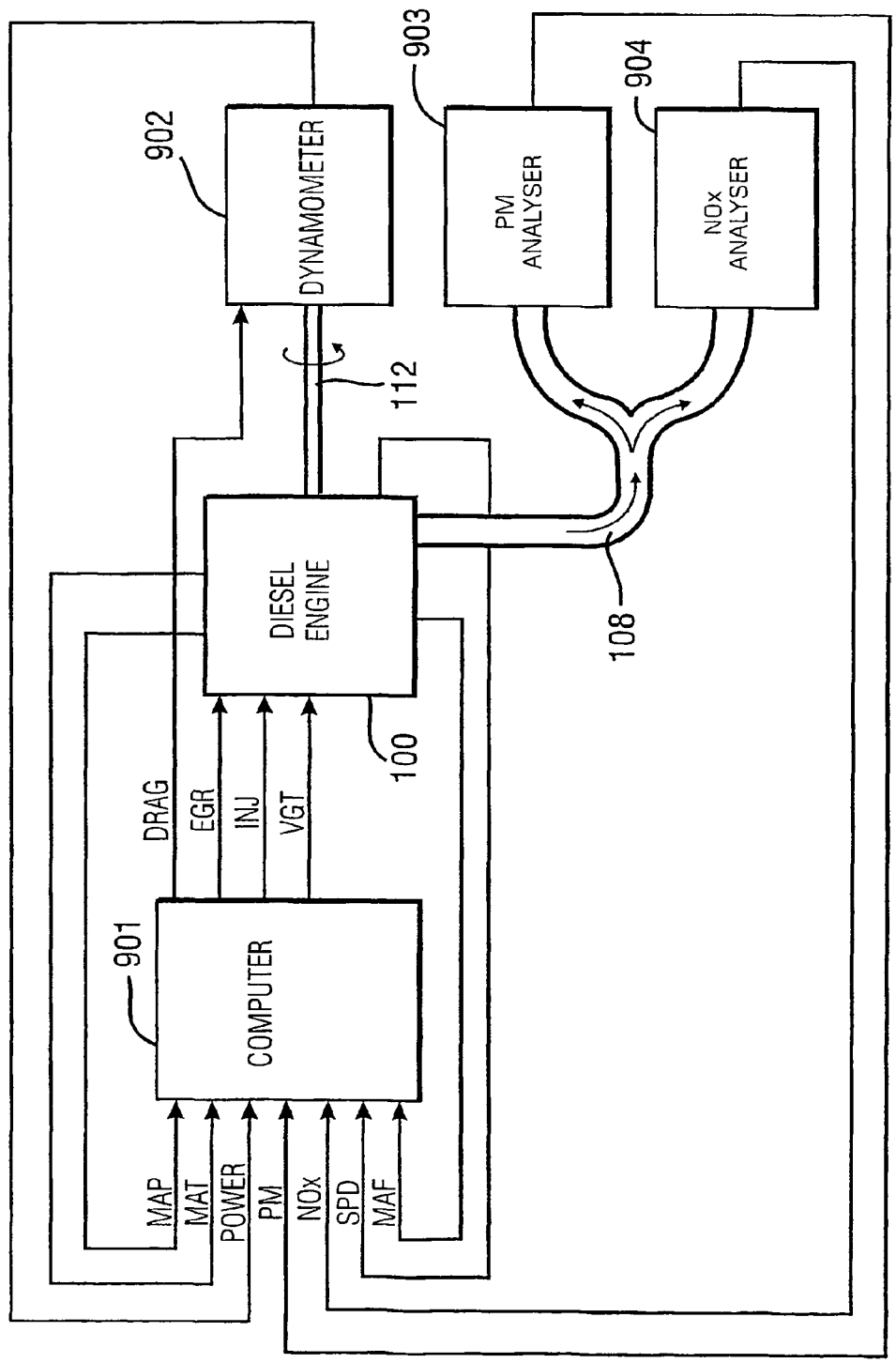
FIG. 9 shows a set-up for determining the values of coefficients used in the predictive model, steady-state maps and in the control algorithm.

FIG. 9 shows a schematic diagram of a system 900 for acquiring the data needed for the steady state maps 601 and the predictive controller 602 of the controller 201. Note that the calibration system 900 is an off-line system and would typically operate for about a day whilst trying out different EGR and VGT settings at different speeds and loads and also determining the response of the engine 100 to various step changes of the EGR and VGT settings.

The system 900 comprises the Diesel engine 100, a computer 901, a dynamometer 902, a PM analyser 903 and a $NO_x$ analyser 904. In the system 900 the computer 901 replaces the controller 201 and produces the signals VGT, EGR and INJ for controlling the relevant actuators of the Diesel engine 100. The crankshaft 112 of the Diesel engine 100 is connected to the dynamometer 902 which impedes rotation of the crankshaft 112 in response to a signal DRAG from the computer 901. The dynamometer 902 produces a signal POWER, indicative of the power being developed by the Diesel engine 100, which forms an input to the computer 901.

The exhaust gas 108 from the Diesel engine 100 is split into two streams, one of which enters the PM analyser 903, the other enters the $NO_x$ analyser 904. The PM analyser 903 measures the PM content of the exhaust gas 108 and produces a signal PM which forms an input to the computer 901. The $NO_x$ analyser 904 measures the $NO_x$ content of the exhaust gas 108 and in response to this produces a signal $NO_x$ which forms an input to the computer 901. The computer 901 also receives as inputs the signals MAP, MAT, SPD and MAF from the relevant sensors of the Diesel engine 100.

In order to determine the $VGT_{SS}$ and $EGR_{SS}$ parameters for the steady state maps 601, the computer 901 may fuel the engine 100 at one of several predetermined fuelling rates and maintains the speed of the engine 100 at one of several predetermined speeds by using the dynamometer 902 to apply a variable impediment to the rotation of the crankshaft 112. For each combination of speed and load (fuelling rate), the computer 901 evaluates different combinations of VGT and EGR settings with regard to the power developed by the engine 100 (i.e. the fuel efficiency) and PM and $NO_x$ emissions. Note that the power developed by the engine will vary with the EGR and VGT settings and therefore the computer 901 must adjust the DRAG setting so that the dynamometer 902 causes the engine 100 to maintain a substantially constant speed. At some combinations of load and speed there may be a trade-off between the fuel efficiency of the engine 100 and its PM and $NO_x$ emissions in which case the computer 901 must choose settings of VGT and EGR that conform with emissions regulations.

There are two groups of parameters of the predictive controller 602 that the computer 901 must determine. These are (i) the a_xxx$_i$ and b_xxx_xxx$_i$ parameters used by the predictor 706 and (ii) the $k_{ax}$ and $k_{ex}$ constants for weighting costings produced by the steady state coster 702, the actuation coster 703 and the transient coster 709. To determine the a_xxx$_i$ and b_xxx_xxx$_i$ parameters, the computer 901 may wait until the engine 100 is operating under steady state conditions and then cause an abrupt change of the VGT and EGR settings whilst recording the effect of these changes on $MAIR_{MEAS}$ and $MEGR_{MEAS}$. In order to obtain representative data, many abrupt changes of different amplitudes involving VGT, EGR separately and VGT and EGR together are used at a variety of speeds and loads. Using the least squares fitting method (described later), the computer 901 then determines a_xxx$_i$ and b_xxx_xxx$_i$ parameters that minimise the overall error between the predicted response of the engine 100 and the actual response.

The a_xxx$_i$ and b_xxx_xxx$_i$ parameters are determined by using the least squares method to fit the MAIR and MEGR values predicted by the predictor 706 to the actual MAIR and MEGR data recorded when abrupt changes were made to the VGT and EGR settings while operating the Diesel engine 100 as part of the system 900. Before discussing the relatively complicated determination of the a_xxx$_i$ and b_xxx_xxx$_i$ parameters, the related but simpler problem of fitting a straight line to a set of three data points will be discussed.

Figure 10:
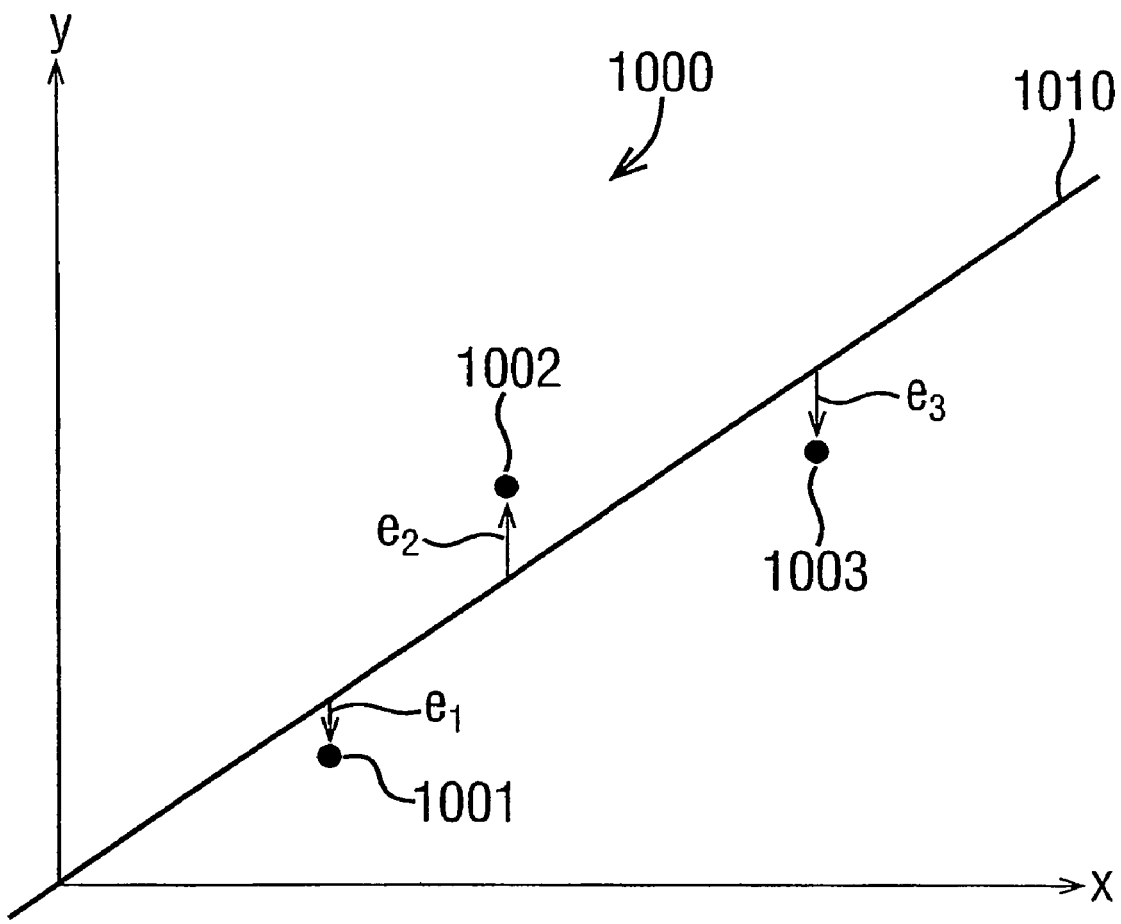
FIG. 10 shows a graph illustrating how a line may be fitted to data points.

FIG. 10 shows a graph 1000 having x and y axes. A line of best fit 1010 having the equation y=θx passes through the origin and also near. to three data points 1001, 1002, 1003. (The passing of the line 1010 through the origin of the graph 1000 is equivalent to the behaviour of the airflow model of equations (5) and (6) in which a zero change of the actuator settings produces a. zero change of the airflows.) The distances, in the direction of the y axis, from the line 1010 to the data points 1001, 1002, 1003 are $e_1$, $e_2$, $e_3$, respectively. The overall error, E, between the line 1010 and the three data points is given by equation (14).

$$E = e_1^2 + e_2^2 + e_3^2 \quad (14)$$

E can be minimised by suitable selection of θ. As those skilled in the art will appreciate, the minimum E is achieved by setting θ to the value for which $$\frac{\partial^2 E}{\partial \theta^2} = 0.$$

Whereas the example of FIG. 10 found the value of one parameter, θ, from three data points, to determine the a_xxx$_i$ and b_xxx_xxx$_i$ parameters (a total of thirty parameters) it is preferable to use at least ten thousand data measurements. Determining the values of the a_xxx$_i$ and b_xxx_xxx$_i$ parameters is similar to the prediction of airflows around the Diesel engine 100 using equations (5) and (6). In effect the same model is now used backwards: the parameters are adjusted until the airflows predicted by the model match as closely as possible the airflows recorded by the system 900 during the collection of the ten thousand data measurements.

The a_xxx$_i$ and b_xxx_xxx$_i$ parameters are determined using the least squares method of FIG. 10 although, due to the increased number of variables, matrix arithmetic is now used. The a_air$_i$ and b_air_xxx$_i$ parameters are calculated independently of the a_egr$_i$ and b_egr_xxx$_i$ parameters. Equations (15) to 18) show how the a_air$_i$ and b_air_xxx$_i$ parameters (a total of 15 parameters) are calculated. The a_egr$_i$ and b_egr_xxx$_i$ parameters are calculated in the same way (except that ΔMEGR data measurements are used instead of ΔMAIR measurements) and therefore will not be discussed further.

Equation (15) shows equation (5) rewritten to express $\Delta MAIR_t$ in terms of the remaining coefficients and data measurements (note that a_air$_0$ is defined as having the value of 1).

$$1 \cdot \Delta MAIR_t = \begin{bmatrix} -a\_air_{-1} \\ \vdots \\ -a\_air_{-3} \\ b\_air\_vgt_{-3} \\ \vdots \\ b\_air\_vgt_{-8} \\ b\_air\_egr_{-3} \\ \vdots \\ b\_air\_egr_{-8} \end{bmatrix}^T \begin{bmatrix} \Delta MAIR_{t-1} \\ \vdots \\ \Delta MAIR_{t-3} \\ \Delta VGT_{t-3} \\ \vdots \\ \Delta VGT_{t-8} \\ \Delta EGR_{t-3} \\ \vdots \\ \Delta EGR_{t-8} \end{bmatrix} \quad (15)$$

As ten thousand data measurements are being used, t varies from 0 to 9,999. Accordingly, the differenced and low pass filtered measurement data comprises $\Delta MAIR_t$ from t=−5 to 9,999, and $\Delta VGT_t$ and $\Delta EGR_t$ from t=−10 to 9,996. Equation (15) can be rewritten using matrices, where bold text is used hereinafter to denote a matrix, as equation (16).

$$\Delta MAIR_t = \theta_{AIR}{}^T x_t + e_t \quad (16)$$

Equation (16) rewrites equation (15) in terms of two column matrices, $\theta_{AIR}$ and $x_t$, where $\theta_{AIR}$ and $x_t$ are defined by equations (17a) and (17b) respectively.

$$\theta_{AIR} = \begin{bmatrix} -a\_air_{-1} \\ \vdots \\ b\_air\_egr_{-8} \end{bmatrix}; \quad x_t = \begin{bmatrix} \Delta MAIR_{t-1} \\ \vdots \\ \Delta EGR_{t-8} \end{bmatrix} \quad (17a, b)$$

Equations (17a) and (17b) show that the column matrices $\theta_{AIR}$ and $x_t$ are identical to the column matrices shown in equation (15). In effect, equation (16) represents ten thousand separate equations, one for each value of t from 0 to 9999. As shown, for each of the ten thousand equations there is a difference, $e_t$, between the actual value of $\Delta MAIR_t$ and the predicted value of $\theta_{AIR}{}^T x_t$.

In equation (18) the ten thousand separate equations involving $\Delta MAIR_t$, $x_t$ and $e_t$ have been collated into a single equation using matrices $Y_{AIR}$, X and E, respectively.

$$Y_{AIR} = X \theta_{AIR} + E \quad (18)$$

The matrices $Y_{AIR}$, X and E are defined by equations (19a), (19b) and (19c), respectively.

$$Y_{AIR} = \begin{bmatrix} \Delta MAIR_{9999} \\ \vdots \\ \Delta MAIR_0 \end{bmatrix}; \quad X = \begin{bmatrix} x_{9999}^T \\ \vdots \\ x_0^T \end{bmatrix}; \quad E = \begin{bmatrix} e_{9999} \\ \vdots \\ e_0 \end{bmatrix} \quad (19a, b, c)$$

As is evident from the similarity of equation (18) to the equation y=θx of the line of best fit 1010, in each situation effectively the same problem is being solved except that with equation (18) there are more parameters to be determined and more data measurements to be used.

The matrix E represents the errors in the predicted ΔMAIR airflow. E is caused by non-optimum parameters and deficiencies in the airflow model used to predict the airflow around the Diesel engine 100. If, after the $\theta_{AIR}$ matrix has been calculated, the predicted airflows do not sufficiently match the actual airflows then a more sophisticated model (for example using more coefficients) will have to be used.

By differentiating equation (18) with respect to $\theta_{AIR}$ and solving for $$\frac{\partial^2 E}{\partial \theta^2} = 0,$$

it can be shown that the $\theta_{AIR}$ that minimizes the overall error, E, is given by equation (20), where $^T$ denotes the transpose of a matrix and $^{-1}$ denotes the inverse of a matrix.

$$\theta_{AIR} = (X^T X)^{-1} X^T Y_{AIR} \quad (20)$$

In order to calculate the optimum $\theta_{AIR}$ for the model, the ten thousand measurements are substituted into equation (20) and equation (20) is then evaluated. Methods for transposing and for inverting matrices are readily available though a useful reference is "Solving Least Squares Problems (Classics in Applied Mathematics, No. 15)", Lawson C J and Hanson R J, Society for Industrial & Applied Mathematics 1995, ISBN 08987 13560, the contents of which are included herein by reference.

To determine the relative weights of the cost terms of equations (11) and (12), the computer 901 emulates the controller 201 and also provides VGT, EGR, INJ and DRAG signals to the system 900 in order to simulate the static and also the dynamic portions of the EURO 4 and US Tier 2 emissions regulations. The computer 901 tries out various values for the six constants $k_{a1}$ to $k_{a3}$ and $k_{e1}$ to $k_{e3}$ until a set of values is found that offers acceptable PM and $NO_x$ emissions and substantially optimum fuel economy. The relative influence of $J_{AIR}$ and $J_{EGR}$ on the overall cost is controlled by scaling $k_{a1}$ to $k_{a3}$ with reference to $k_{e1}$ to $k_{e3}$.

In this embodiment the AFR is a primary set point whilst the EGR is a secondary set point and therefore the six $k_{xx}$ constants are chosen so that $J_{AIR}$ dominates $J_{EGR}$. Thus in effect the controller 201 always tries to maintain the AFR at 25 (to provide sufficient oxygen for the required torque and to prevent formation of excess PM matter) and if this has been substantially achieved then it additionally tries to achieve an EGR fraction of 10% (to reduce $NO_x$). The target settings of the AFR and EGR fraction are selected depending on the characteristics of the engine being controlled and the intended application of the engine. Due to the interaction of the two set points, the actual AFR (when the engine is operating under steady-state conditions) will typically be greater than 25 and the actual EGR fraction will typically be less than 10%. In general, a high AFR is desired in order to improve the fuel efficiency of the engine and therefore the AFR and EGR fraction set points are selected having regard to the actual AFR and EGR fraction when the engine is operating under typical loads.

The controller 201 has two degrees of freedom (namely the VGT setting and the EGR setting) and it is therefore desirable that the controller 201 has two constraints (AFR and EGR fraction) that it simultaneously tries to achieve. It is beneficial that the number of constraints should equal the number of degrees of freedom as this entails that for any combination of inputs and past history, there is only one optimal solution. Conversely, if the controller 201 has only one constraint then under some conditions there could be several equally optimum $C_0$ candidates and system noise (for example measurement noise) could cause the controller 201 to alternate between the alternative $C_0$ settings, thereby unnecessarily increasing wear and tear of the VGT and EGR actuators 125, 133. As shown, the computer 901 uses the same signals from the engine 100 that the controller 201 uses. This gives the benefit that factors such as the response time of transducers will inherent be taken into account when the computer 901 prepares the $a\_xxx_i$ and $b\_xxx\_xxx_i$ parameters of the predictor 706.

As those skilled in the art will appreciate, the system 900 was simplified for clarity. More typically, further sensors (not shown) would be used to more fully characterise the Diesel engine 100. For example, sensors may be provided to measure the temperature of the compressed air 102a out of the compressor 121 and further sensors may be used to determine the efficiency of the compressor 121 and of the turbine 123. An Integrated Mean Effective Pressure (IMEP) meter may be used to measure the average pressure in a cylinder. during the course of a combustion cycle. IMEP measurements can be used as an indicator of the stability of combustion as consecutive IMEP measurements from a cylinder may either be stable or be highly variable, depending upon the stability of consecutive combustions within the cylinder. A human operator may be used instead of, or in addition to, the computer 901 to determine the $VGT_{SS}$ and $EGR_{SS}$ parameters of the steady state maps 601. A human operator may also be used to determine optimum values for the $k_{ax}$ and $k_{ex}$ constants. However, due to the computationally intensive nature of determining the $a\_xxx_i$ and $b\_xxx\_xxx_i$ parameters, it is preferred that these parameters are determined by the computer 901. Examples of other sensors (not shown) that may be used as part of the system 900 include laboratory grade instruments. These may be used to supplement, for example, the readings from the mass airflow sensor 141 and the pressure sensor 142. The use of additional sensors allows non-linearities and unit-to-unit variations in the mass airflow 141 and pressure 142 sensors in production models of the Diesel engine 100 to be determined and allowed for.

Although for clarity the exhaust gas 108 is shown in FIG. 9 as being split into two streams, one for the PM analyser 903 and the other for the $NO_x$ analyser 904, in some situations it may be more convenient to pass all of the exhaust gas 108 through the $NO_x$ analyser 904 and then through the PM analyser 903. When the arrangement depicted in FIG. 9 is used then the readings from the PM analyser 903 and $NO_x$ analyser 904 must each be doubled as each analyser only receives half of the exhaust gas 108.

EMBODIMENT 2

As those skilled in the art will appreciate, the generator 701 performed an exhaustive search through all 625 combinations of $C_0$, $C_1$ but there are algorithms available which can reduce the number of calculations that need to be performed by the controller 201 at each timestep. An example of such an algorithm is the Mixed Weights Least-Squares (MWLS) algorithm, further details of which may be found in "Solving Least Squares Problems", Lawson and Hanson, Prentice-Hall, 1974, the contents of which are included herein by reference.

An example of the use of the MWLS algorithm may also be found in "Multiple Order Models in Predictive Control", PhD thesis, Trinity College, Oxford, UK, 1999, the contents of which are incorporated herein by reference. Chapter 5 of this is the most relevant although the cost functions used therein do not include the terms associated with the deviation of the actuators from the optimal steady state positions. The MWLS algorithm allows the generator 701 to find the optimum $C_0$ candidate in a single step provided that the particular model being used is linear and that no constraints are violated.

Embodiment 2 is similar to embodiment 1 except that the generator 701 uses the MWLS algorithm rather than the brute force method of evaluating every single possible combination. The MWLS algorithm is particularly useful where a brute force approach is untenable. For example, for embodiment 2 the resolution of the VGT and EGR 125, 123 actuators is instead 0.01 and, as before, they may move by up to ±0.2 of the full scale range in a single timestep. Thus the number of $C_0$ candidates is up to 1,600 (depending upon the VGT and EGR values of $C_{-1}$, with potentially a similar number of $C_1$ candidates for each $C_0$ candidate). With current technology it is not economical to provide the controller 201 with enough processing power to evaluate millions of $C_0$, $C_1$ permutations every 60 ms. Embodiment 2 is therefore in general preferred over embodiment 1 as it offers a lower computational burden on the microprocessor 203. The MWLS algorithm may conveniently be implemented using the "C" programming language.

The MWLS algorithm uses constraints to ensure that the VGT and EGR values of the optimum $C_0$ candidate are both reasonable and realistic. By reasonable it is meant that the proposed values of VGT and EGR lie within the full scale range of 0 to 1 and by realistic it is meant the changes demanded of the VGT and EGR actuators 125, 133 are not more than they can physically move in a 60 ms timestep. The MWLS algorithm as used in embodiment 2 also calculates optimum values for $C_1$ though, as for embodiment 1, $C_1$ is never used to update the VGT and EGR actuators 125, 133.

When using the MWLS algorithm a single iteration is first performed and the solution checked to see whether it has violated any of the constraints. If all the constraints have been met then the solution may be used directly. Alternatively, if one or more constraints have been violated then it is necessary to iterate the MWLS algorithm until successive iterations have converged sufficiently. The proposed $C_0$ candidate is deemed to have converged when the difference between the VGR and EGR settings of the current $C_0$ candidate, and the settings of the previous iteration, is less than the resolution of the VGT and EGR actuators 125, 133.

If the first iteration does not meet all the constraints then subsequent iterations will either converge on the optimal solution which meets all the constraints or, if there is no solution that meets all the constraints, will converge on the solution that minimises the maximum constraint violation. In case the MWLS algorithm converges too slowly an upper limit, e.g. 200, may be set on the number of iterations that are to be performed (after which the VGT and EGR settings of the $200^{th}$ iteration are used regardless). This upper limit ensures that a new $C_0$ candidate (even if not optimal) is produced for updating the VGT and EGR actuators 125, 133 before the end of the current 60 ms timestep.

Equation (21) gives the equation defining the MWLS algorithm.

$$\Delta u^{(i)} = \left( \begin{bmatrix} R \\ L \end{bmatrix}^T \begin{bmatrix} w^{(i)}I & 0 \\ 0 & W^{(i)} \end{bmatrix} \begin{bmatrix} R \\ L \end{bmatrix} \right)^{-1} \begin{bmatrix} R \\ L \end{bmatrix}^T \begin{bmatrix} w^{(i)}I & 0 \\ 0 & W^{(i)} \end{bmatrix} \begin{bmatrix} V \\ C \end{bmatrix} \quad (21)$$

As before, matrices are shown in bold text. The significance of the various terms of equation (21) will now be explained.

$$\Delta u^{(i)} = \begin{bmatrix} \Delta VGT_0^{(i)} \\ \Delta EGR_0^{(i)} \\ \Delta VGT_1^{(i)} \\ \Delta EGR_1^{(i)} \end{bmatrix}; \quad R = \begin{bmatrix} (M^{1/2}G) \\ \Lambda^{1/2} \\ N^{1/2} \end{bmatrix} \quad (22a, b)$$

Equation (22a) shows $\Delta u^{(i)}$ which contains the $\Delta VGT$ and $\Delta EGR$ values of the $C_0$ and $C_1$ candidates of the $i^{th}$ iteration. i=0 for the first iteration. If $\Delta u^{(0)}$ meets all the constraints then $\Delta VGT_0^{(0)}$ and $\Delta EGR_0^{(0)}$ may be used to update the VGT and EGR actuators 125, 133. Otherwise, the $\Delta VGT_0^{(i)}$ and $\Delta EGR_0^{(i)}$ values from a subsequent iteration will have to be used.

Equation (22b) defines the matrix R. R has 28 rows and 4 columns and itself consists of three matrices. The first of these matrices is the product of a matrix $M^{1/2}$ (where the $^{1/2}$ denotes that each element in the matrix is to be square rooted) with a matrix G. The second matrix is $\Lambda^{1/2}$ whilst the third is $N^{1/2}$. These 3 matrices will now be defined.

$$M = \begin{bmatrix} M_1 & 9 & \cdots & 0 & 0 \\ 0 & M_2 & \cdots & 0 & 0 \\ \vdots & \vdots & \ddots & \vdots & \vdots \\ 0 & 0 & \cdots & M_9 & 0 \\ 0 & 0 & \cdots & 0 & M_{10} \end{bmatrix}; \quad (23a, b, c)$$

$$M_1, M_2 = 0; \quad M_3 \cdots M_{10} = \begin{bmatrix} k_{a1} & 0 \\ 0 & k_{e1} \end{bmatrix}$$

Equation (23a) defines M. As can be seen, M is a diagonal matrix comprising ten matrices, $M_1$ to $M_{10}$. The term diagonal matrix will hereinafter be used to denote a matrix where all the elements of interest (here $M_1$ to $M_{10}$) lie on the leading diagonal, i.e. from the top left to the bottom right of the matrix, whilst all the elements off the leading diagonal are zero.

The "prediction horizon" of embodiment 2 is ten timesteps into the future as the future airflows are predicted for timesteps t=1 to t=10. There are consequently 10 matrices within M. (If the prediction horizon were for example increased to twelve timesteps then M would contain twelve matrices instead of 10.) Each of the matrixes $M_1$ to $M_{10}$ is a 2×2 diagonal matrix. As can be seen from equation (23b), $M_1$ and $M_2$ are both 0 where 0 denotes a matrix whose elements are all 0. $M_1$ and $M_2$ are 0 as it is only the effects of the $C_0$ candidate on timesteps t=3 to t=10 that are costed (thus the "cost horizon" is timesteps t=3 to t=10). Equation (23c) defines $M_3$ to $M_{10}$ as diagonal matrices whose elements are $k_{a1}$ and $k_{e1}$.

$$G = \begin{bmatrix} G_1 & 0 \\ G_2 & G_1 \\ \vdots & \vdots \\ G_{10} & G_9 \end{bmatrix}; \quad G_n = \begin{bmatrix} g_{11}^n & g_{12}^n \\ g_{21}^n & g_{22}^n \end{bmatrix} \quad (24a, b)$$

Equation (24a) defines G in terms of sub-matrices $G_1$ to $G_{10}$. In terms of its sub-matrices, G has ten rows, corresponding to the prediction horizon of ten timesteps (t=1 to t=10), and two columns, corresponding to a "control horizon" of two timesteps (t=0 and t=1). Here, the control horizon is two timesteps as the MWLS algorithm finds solutions for $C_0$ and $C_1$ based on their future effects. The control horizon could be extended beyond 2 although in most applications the extra computational effort required will not be justified by a significantly improved control performance; the control horizon could be reduced to 1 although this would not allow the predictive controller 602 to take into account its own predicted actions when determining the optimum $C_0$.

Equation (24b) defines the coefficients $g_{xx}^n$ within each of the sub-matrices $G_n$. For timestep n, $g_{11}^n$ gives the effect of a step change of EGR on MAIR, $g_{12}^n$ gives the effect of a step change of VGT on MAIR, $g_{21}^n$ gives the effect of a step change of EGR on MEGR and $g_{22}^n$ gives the effect of a step change of VGT on MEGR.

G defines the "step response" of the model being used to predict MAIR and MEGR. In this embodiment, the model being used is that of equations (5) and (6). The matrixes $G_1$ to $G_{10}$ give the step response of the model for timesteps t=1 to t=10, respectively.

Figure 11:
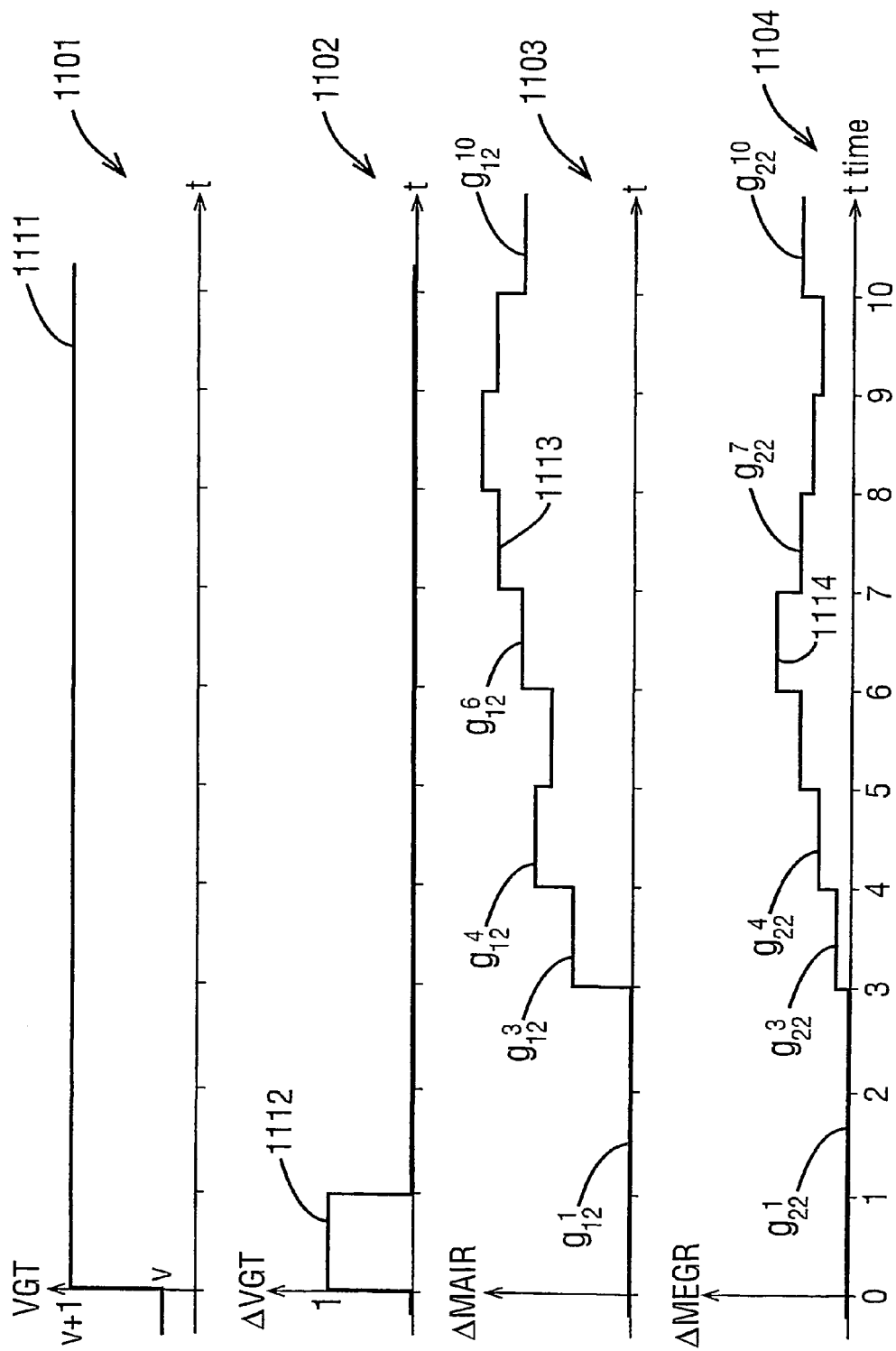
FIG. 11 shows the physical significance of step response coefficients used in a second embodiment of the invention.

FIG. 11 shows the physical significance of the step response coefficients $g_{xx}{}^n$ and will also be used to explain how they are calculated. FIG. 11 shows four graphs sharing a common time axis from timesteps t=0 to t=10 and illustrates how a step change in VGT at the current timestep, t=0, would effect the following 10 timesteps to t=10.

A graph 1101 shows a plot 1111 of VGT. At timestep t=0 VGT increases from a nominal value of v to v+1. (Note that the actual value of v does not matter as the predictor 706 responds to changes in VGT. Note also that it does not matter whether increasing VGT by 1 would violate any constraints as the step response is simply used to characterise the effects of a change at t=0 on the future air flows around the Diesel engine 100).

A graph 1102 shows a plot 1112 of $\Delta$VGT and shows that $\Delta$VGT takes the value of 1 for the timestep t=0, corresponding to the step increase of VGT, but is zero elsewhere.

A graph 1103 shows a plot 1113 of $\Delta$MAIR which has been annotated to show the correspondence between the values of $\Delta$MAIR at timesteps t=0 to t=10 and the step response coefficients $g_{12}{}^1$ to $g_{12}{}^{10}$.

A graph 1104 shows a plot 1114 of $\Delta$MEGR which has been correspondingly annotated with $g_{22}{}^1$ to $g_{22}{}^{10}$.

As can be seen, $g_{12}{}^1$, $g_{12}{}^2$, $g_{22}{}^1$ and $g_{22}{}^2$ are all 0 as a change of VGT at t=0 does not have any effect until t=3. (Note that $\Delta$VGT and $\Delta$EGR are assumed to be zero before t=0 so that the responses of $\Delta$MAIR and $\Delta$MEGR are entirely due to the step in VGT at t=0 and not the result of any changes prior to t=0.)

It is evident from inspection of equations (5) and (6) that $g_{12}{}^3$ has the value of b_air_vgt$_{-3}$ and that $g_{22}{}^3$ has the value b_air_egr$_{-3}$. Due to the recursive nature of the linear model of equations (5) and (6), $g_{12}{}^4$ has the value (b_air_vgt$_{-4}$ − (a_air$_{-1}$ .b_air_vgt$_{-3}$)) and correspondingly $g_{22}{}^4$ has the value (b_air_egr$_{-4}$ − (a_air$_{-1}$.b_air_egr$_{-3}$)) and so on for timesteps 5 to 10.

$g_{11}{}^n$ and $g_{12}{}^n$ are determined similarly using a step change of EGR. $g_{11}{}^1$, $g_{11}{}^2$, $g_{21}{}^1$ and $g_{21}{}^2$ are also all 0.

The left hand column of G corresponds to $G_n$ used for determining $C_0$ and therefore includes $G_1$ to $G_{10}$. The right hand column of G contains values used for determining $C_1$ and therefore the uppermost entry is 0 as $C_1$ cannot have any effects at timestep t=0. Thus the right hand column then continues with entries from $G_1$ to $G_9$; there is no entry for $G_{10}$ as this would correspond to a timestep of t=11 which is outside the prediction horizon of 10. (If it were desired to use the MWLS algorithm to also calculate $C_2$, for example to take into account the consequential effects of $C_2$ on $C_0$, then a further column would be introduced onto the right hand side of G. The uppermost two entries of this further column would be 0 and the remaining entries would be $G_1$ to $G_8$). $M^{1/2}$ weights G so that deviations of the predicted air flow away from the required air flow are penalised.

$$\Lambda = \begin{bmatrix} \Lambda_1 & 0 \\ 0 & \Lambda_2 \end{bmatrix}; \Lambda_1, \Lambda_2 = \begin{bmatrix} k_{a2} & 0 \\ 0 & k_{e2} \end{bmatrix} \quad (25a, b)$$

$\Lambda$ is defined by equation (25a) and is a diagonal matrix consisting of two matrices, $\Lambda_1$ and $\Lambda_2$. $\Lambda_1$ and $\Lambda_2$ are defined by equation (25b) and are diagonal matrices whose elements are $k_{a2}$ and $k_{e2}$. $\Lambda_1$ weights the costs of moving the VGT and EGR actuators 125, 133 for $C_0$ whilst $\Lambda_2$ weights the costs for $C_1$.

Note that if the cost horizon were to be increased to, say, 4 then $\Lambda$ would be 4×4 diagonal matrix with additional terms $\Lambda_3$ and $\Lambda_4$ $$N = \begin{bmatrix} N_1 & 0 \\ 0 & N_2 \end{bmatrix}; N_1, N_2 = \begin{bmatrix} k_{a3} & 0 \\ 0 & k_{e3} \end{bmatrix} \quad (26a, b)$$

N is defined by equation (26a) as a 2×2 diagonal matrix consisting of $N_1$ and $N_2$. $N_1$ and $N_2$ are defined by equation (26b) and are both diagonal matrixes whose elements are $k_{a3}$ and $k_{e3}$. $N_1$ and $N_2$ penalise, for $C_0$ and $C_1$ respectively, deviations of the VGT and EGR actuators 125, 133 away from the steady state values VGT$_{SS}$ and EGR$_{SS}$. (Note that as with G, if the cost horizon were to be increased to, say, 3 then N would be a 3×3 matrix with $N_3$ being used for $C_3$.)

$$L = \begin{bmatrix} L_u \\ L_{du} \end{bmatrix}; L_u = \begin{bmatrix} L_1 & 0 \\ L_1 & L_1 \end{bmatrix}; L_1 = \begin{bmatrix} 2 & 0 \\ 0 & 2 \end{bmatrix} \quad (27a, b, c)$$

L is defined by equation (27a) and is a column matrix consisting of matrixes $L_u$ and $L_{du}$. $L_u$ is defined by equation (27b) and consists of matrixes $L_1$ on the leading diagonal and below the leading diagonal whilst all the other elements are 0. Matrixes having the configuration of $L_u$ will hereinafter be termed "triangular". $L_1$ is a diagonal matrix as defined by equation (27c). The elements of $L_1$ are determined by the reciprocal of the arithmetic mean of the limits of the variables (here VGT and EGR) being constrained. The top left element of $L_1$ constrains the VGT values produced by the MWLS algorithm to lie within the full scale range of 0 to 1. The arithmetic mean of 0 and 1 is 0.5 (for VGT and for EGR) giving values of 2 for the matrix $L_1$.

$$L_{du} = \begin{bmatrix} L_2 & 0 \\ L_2 & L_2 \end{bmatrix}; L_2 = \begin{bmatrix} 5 & 0 \\ 0 & 5 \end{bmatrix} \quad (28a, b)$$

$L_{du}$ is defined by equation (28a) and is a triangular matrix consisting of the elements $L_2$. $L_2$ is a diagonal matrix defined by equation (28b) whose elements define the reciprocal of the maximum change permitted of the VGT and EGR actuators 125, 133 during a single timestep. The top left element of $L_1$ defines the maximum change permitted for the VGT actuator 125. The values of 5 for VGT and for EGR are arrived at by dividing the full scale range, 1, by the maximum possible change, 0.2.

$$w^{(i)}I = \begin{bmatrix} w^{(i)} & 0 & \cdots & 0 & 0 \\ 0 & w^{(i)} & \cdots & 0 & 0 \\ \vdots & \vdots & \ddots & \vdots & \vdots \\ 0 & 0 & \cdots & w^{(i)} & 0 \\ 0 & 0 & \cdots & 0 & w^{(i)} \end{bmatrix} \quad (29a,b)$$

$$W^{(i)} = \begin{bmatrix} w_{11} & 0 & \cdots & 0 & 0 \\ 0 & \ddots & \cdots & 0 & 0 \\ \vdots & \vdots & w_{jj} & \vdots & \vdots \\ 0 & 0 & \cdots & \ddots & 0 \\ 0 & 0 & \cdots & 0 & w_{88} \end{bmatrix}$$

$w^{(i)}I$ is defined by equation (29a) and is the unit matrix I multiplied by the scalar $w^{(i)}$. In embodiment 2, $w^{(i)}I$ is a diagonal matrix having 28 rows and 28 columns. $W^{(i)}$ is a diagonal matrix consisting of the terms $w_{jj}$ and has 8 rows and 8 columns. For the first iteration, $w^{(0)}=1$ and all 8 elements $w_{jj}^{(0)}$ of $W^{(0)}$ are set to 1.

$$V = \begin{bmatrix} (M^{(1/2)}F) \\ 0 \\ (N^{1/2}S) \end{bmatrix}; \quad F = \begin{bmatrix} MAIR_{REQ} - FMAIR_1 \\ MEGR_{REQ} - FMEGR_1 \\ \vdots \\ MAIR_{REQ} - FMAIR_{10} \\ MEGR_{REQ} - FMEGR_{10} \end{bmatrix} \quad (30a,b)$$

V is a column matrix having 28 rows and is defined by equation (30a). V consists of three matrixes: $(M^{1/2}F)$, 0 and $(N^{1/2}S)$. F is defined by equation (30b) and is a column vector, having 20 rows, and gives the difference between $MAIR_{REQ}$ and $MEGR_{REQ}$ and the predicted "free response" of the Diesel engine 100.

The free response consists of FMAIR$_1$ to FMAIR$_{10}$ and FMEGR$_1$ to FMEGR$_{10}$, and gives the values of MAIR and MEGR predicted to occur, for the next 10 time steps, if no changes are made to the settings of the VGT and EGR actuators 125, 133. Thus in contrast to the step response matrix G (which gives information concerning the effects of alterations of the setting of VGT and EGR) the free response matrix F gives information concerning the air flows around the Diesel engine 100 if no changes are made. F can be calculated using equations (5) and (6). Note that whereas G is a constant, F must be recalculated at each timestep to take into account the recent past history of the airflows around the Diesel engine 100.

The second matrix within V is 0. The third matrix within V is $(N^{1/2}S)$. S gives the MWLS algorithm information concerning the steady state requirements of the Diesel engine 100, i.e. the requirements dictated by the current value of the LOAD signal.

$$S = \begin{bmatrix} MAIR_{SS} - MAIR_{-1} \\ MEGR_{SS} - MEGR_{-1} \\ MAIR_{SS} - MAIR_{-1} \\ MEGR_{SS} - MEGR_{-1} \end{bmatrix} \quad (31)$$

S is defined by equation (31) and indicates the difference, if any, between the steady state values of $MAIR_{SS}$ and $MEGR_{SS}$ and $MAIR_{-1}$ and $MEGR_{-1}$. S is a column matrix having two pairs of two rows; the uppermost pair of MAIR and MEGR values is associated with $C_0$ whilst the lower pair is associated with $C_1$.

The matrices $N^{1/2}$ and $(N^{1/2}S)$ have been introduced into the terms R and V, respectively, of the MWLS algorithm in order to introduce costs to penalise any deviation of the predicted MAIR and MEGR values away from $MAIR_{SS}$ and $MEGR_{SS}$.

$$C = \begin{bmatrix} C_u \\ 0 \end{bmatrix}; \quad C_u = \begin{bmatrix} (0.5 - VGT_{-1})/0.5 \\ (0.5 - EGR_{-1})/0.5 \\ (0.5 - VGT_{-1})/0.5 \\ (0.5 - EGR_{-1})/0.5 \end{bmatrix} \quad (32a,b)$$

C is defined by equation (32a) and is a column matrix having eight rows, the lowermost four of which are 0. The uppermost four rows of C are given by the matrix $C_u$ as defined by equation (32b). $C_u$ provides information about the most recent positions of the VGT and EGR actuators 125, 133. In equation (32b), the number 0.5 in the dividend arises as 0.5 is the mid point of the full scale range of the VGT and EGR actuators 125, 123. The number 0.5 in the divisor of equation (32b) arises as the "distance" from the midpoint to either end of the full scale range is 0.5.

$$e^{(i)} = L\Delta u^{(i)} - C \quad (33)$$

Equation (33) is used after an iteration of the MWLS algorithm to determine whether $\Delta u^{(i)}$ has met all eight constraints. There are eight constraints, as for both $C_0$ and $C_1$, both the full scale range and the maximum permissible change must be valid for both the VGT actuator 125 and the EGR actuator 133. Equation (34) defines a column matrix $e^{(i)}$ having eight rows.

$$e^{(i)} = \begin{bmatrix} e_1^{(i)} \\ \vdots \\ e_8^{(i)} \end{bmatrix} \quad (34)$$

If all eight constraints have been satisfied then $e_1^{(i)}$ to $e_8^{(i)}$ will all be less than 1. If one or more of these elements is greater than 1 then another iteration of the MWLS algorithm should be performed.

$$w^{(i+1)} = \frac{w^{(i)}}{\sum_{k=1}^{8} w_{kk}^{(i)}|e_k^{(i)}|}; \quad w_{jj}^{(i+1)} = \frac{w_{jj}^{(i)}|e_j^{(i)}|}{\sum_{k=1}^{8} w_{kk}^{(i)}|e_k^{(i)}|} \quad (35a,b)$$

Whenever another iteration is to be performed $w^{(i)}I$ must be updated for use by iteration i+1 using equation (35a) and $W^{(i)}$ must be updated for the i+1 iteration using equation (35b).

In general there are three outcomes when using the MWLS algorithm. The first outcome is that $\Delta u^{(0)}$ satisfies all the constraints after a single iteration. In this case $\Delta VGT_0^{(0)}$ and $\Delta EGR_0^{(0)}$ are used directly for $C_0$. If the first iteration does not yield a solution meeting all the constraints then one or more further iterations will be required. The second outcome is that these further iterations gradually converge on a feasible solution satisfying all the constraints. The third outcome is that there is no solution which satisfies all the constraints; in this case further iterations of the MWLS algorithm will converge on the solution which minimises the maximum constraint violation. For the second and third outcomes it is more convenient to check for convergence than to check for violations of the constraints. Equations (36a) and (36b) show the conditions used to check for convergence.

$$\Delta VGT_0^{(i)} - \Delta VGT_0^{(i-1)} < 0.01;$$ (36a, b)
$$\Delta EGR_0^{(i)} - \Delta EGR_0^{(i-1)} < 0.01$$

In embodiment 2, the MWLS algorithm is deemed to have converged if the difference between the VGT and the EGR values of consecutive iterations is comparable with the resolution of the VGT and EGR actuators 125, 133. In this embodiment the resolution of these actuators is 0.01 and thus equations (36a) and (36b) each contain the value 0.01.

For the second and third outcomes there is a risk that the MWLS algorithm will converge too slowly to have converged upon a solution by the time that the VGT and EGR actuators 125, 133 must be updated with their new values of $VGT_{OPT}$ and $EGR_{OPT}$. To guard against this possibility the number of iterations that have been performed for the current timestep is monitored and if exceeds a certain number then current iteration is used regardless of whether it has converged. For embodiment 2 the maximum number of iterations that are performed in a single timestep is limited to 200.

For the second and third outcomes, $\Delta VGT_0^{(i)}$ and $\Delta EGR^0{}_{(i)}$ must be modified to ensure that the values of $VGT_{OPT}$ and $EGR_{OPT}$ sent to the VGT and EGR actuators 125, 133 lay within the full scale range of 0 to 1 and that the values sent do not differ from those of the previous timestep by more than 0.2.

Figure 12:
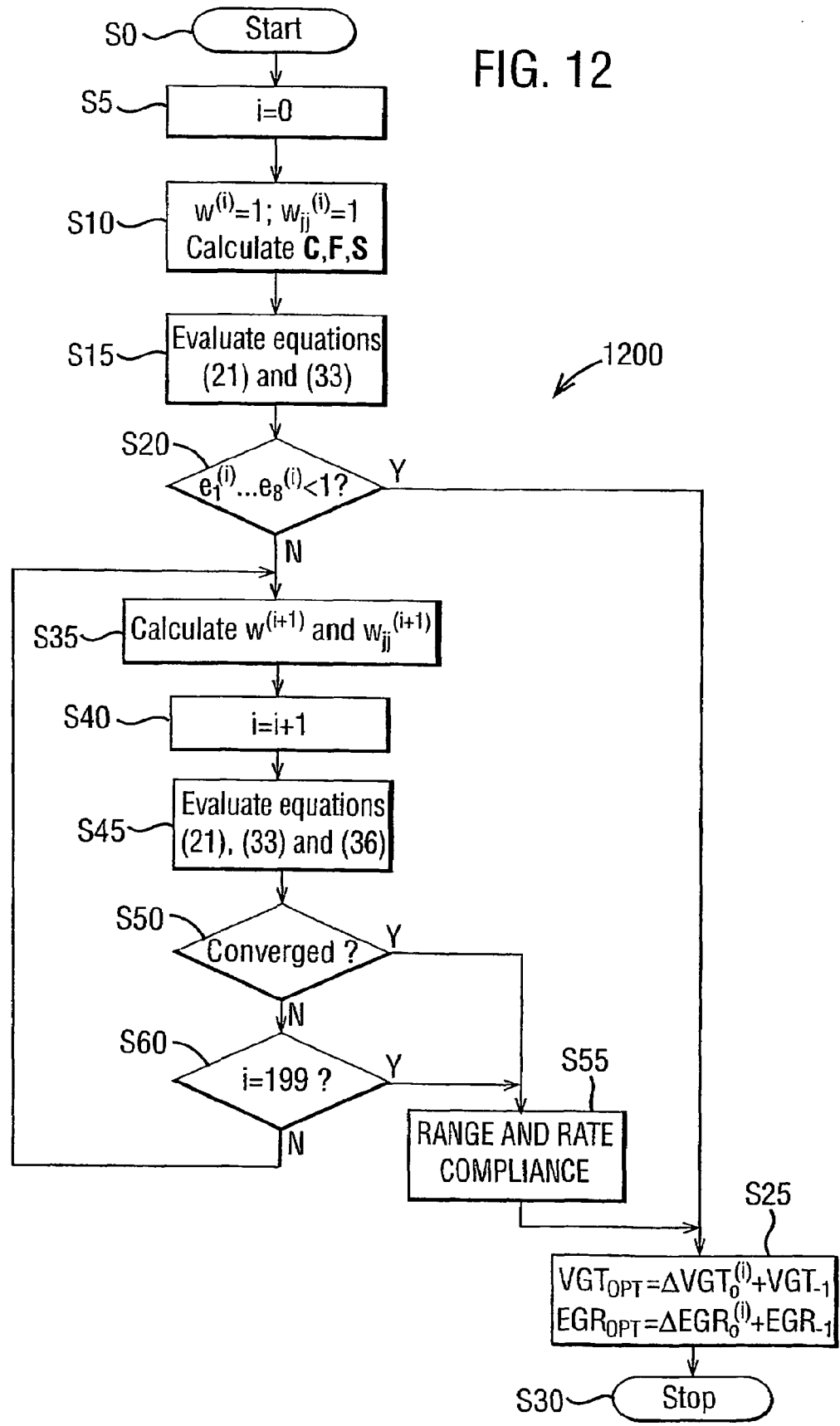
FIG. 12 shows a flowchart of some of the operations to be performed for each timestep of the second embodiment.

FIG. 12 shows a flow chart 1200 which illustrates some of the operations to be performed during each timestep by the predictive controller 602 for embodiment 2. The flow chart 1200 only shows operations to be performed at each time step and does not therefore show operations concerning the calculation of constant matrices.

The constant matrices include $M^{1/2}$, $(M^{1/2}G)$, $\lambda^{1/2}$, $N^{1/2}$ and L. These matrices are characteristic of the Diesel engine 100 and are therefore most suitably calculated by the computer 901 during characterisation of the Diesel engine 100. In embodiment 2 they are stored as constants within the ROM 204 and are stored, for example, in the form $N^{1/2}$ rather than N in order to minimise the number of calculations that the controller 201 must perform every timestep. Minimisation of the number of calculations to be performed at each time step allows the use of a less powerful, and therefore cheaper, microprocessor 203 (or allows the timestep to be decreased in order to allow the controller 201 to respond to briefer transients). The flow chart 1200 also does not show the steps for differencing and low pass filtering incoming data (this is done in the same way as was done with equations (1) to (4)).

Step S0 is the start of the flow chart 1200. At step S5 an index variable, i, is initialised to 0. i is the same variable used in equations (21) to (36) to distinguish successive iterations. At step S10 $w^{(i)}$ and $w_{jj}^{(i)}$ are initialised to 1 ready for the first iteration. C, F and S are also calculated for the current timestep from measurements and from the recent past history of the Diesel engine 100. Equations (2) and (33) are then evaluated at step S15.

At step S20 the eight elements of $e^{(i)}$ are each checked to see whether they are less than one in order to determine whether one or more constraints have been violated. If no constraints have been violated then control passes to step S25 which, based on the first iteration, outputs new values of $VGT_{OPT}$ and $EGR_{OPT}$ to be issued to the VGT and EGR actuators 125, 133 at timestep t=1.

If one or more constraints have been violated then control passes from step S20 to S35. Step S35 calculates $w^{(i+1)}$ and $w_{jj}^{(i+1)}$ for use during the next iteration of the MWLS algorithm. Step S40 increments i by one and then step S45 evaluates equations (2), (33) and (36).

Step S50 checks the result of equation (36) to determine whether the MWLS algorithm has converged sufficiently. If it has then control passes to step S55 otherwise control passes to step S60.

Step S55 checks the values of $\Delta VGT_0^{(i)}$ and $\Delta EGR_0^{(i)}$ to determine whether they would cause the full scale range constraints or the maximum permissible rate of change constraints of the actuators to be violated. If necessary, the values are modified to ensure compliance with the constraints and then control passes to step S25.

Step S60 checks to determine whether the maximum number of iterations allowed for a timestep has been exceeded. If i equals 199 (i.e. the 200th iteration) then regardless of whether the MWLS algorithm has converged, control passes to step S55. If i is less than 199 then control passes to step S35 so that another iteration of the MWLS algorithm may be undertaken.

EMBODIMENT 3

In embodiments 1 and 2 a controller 201 was used in which two outputs, $VGT_{OPT}$ and $EGR_{OPT}$, were controlled on the basis of two inputs, $MAIR_{MEAS}$ and $MEGR_{MEAS}$. The methodology of the control system 300, in which information from the steady state maps 301 was combined with information from the predictive model 301 by the control algorithm 302, may more generally be applied to situations where equations defining the future behaviour of the system being controlled are either not available or where such equations cannot readily be solved in real time.

The methodology may also be used for applications having different numbers of inputs and outputs from that of embodiments 1 and 2. The simplest application possible is where a single output is controlled on the basis of a single input. More generally, the methodology is useful for multi-variable control where the cost function allows one or more outputs to be controlled on the basis of one or more inputs.

For example, the control system 201 could be modified so that it also controlled the exhaust valve timing of a Diesel engine having variable valve timing. By varying the exhaust valve timing, such a modified controller could control the pressure of the exhaust manifold gas 105, thus influencing the amount of EGR. However, altering the exhaust valve timing would also alter the efficiency of the engine and so the cost function of the modified controller would need to include cost terms in order to determine the optimum settings for the actuator of the variable valve timing.

For embodiment 3 a modified controller controlling an air conditioning system will be described. The air conditioning system consists of three air conditioning units for air conditioning a bakery. The modified controller controls the flow rate and the temperature of the air coming out of each of the air conditioning units in order to maintain the air temperature in the vicinity of each of four thermostats at respective temperature settings. Each thermostat has a temperature sensor for measuring the ambient air temperature and a dial for selecting a required ambient air temperature. The measured air temperatures correspond to $MAIR_{MEAS}$ and $MEGR_{MEAS}$ of embodiments 1 and 2 whilst the required temperatures correspond to $MAIR_{REQ}$ and $MEGR_{REQ}$. Thus the controller of embodiment 3 controls six outputs on the basis of four measured inputs.

For embodiment 3 the steady state maps receive the four required temperature settings and give the three values of air flow rate and the three values of air temperature for the air conditioning units that, in the steady state, most closely satisfy the four required temperatures. Each time one of the ovens in the bakery is opened, the ambient air temperature in the vicinity of the opened oven will transiently increase. For embodiment 3, the predictive model predicts the impact of the transient by taking into account the measured air temperatures and the recent past history of the air conditioning units so that new settings can be issued to the air conditioning units to minimise the disturbance to the measured air temperatures as a result of the oven being opened. The bakery of embodiment 3 has several ovens which produce different transient effects and, consequently, different responses from the modified controller.

Due to the increased response time of the air temperatures the timestep between two successive samples may conveniently be increased to one second.

Some of the alterations that the four inputs and six outputs of embodiment 3 require to equations (21) to (36) will now be described. Only the major alterations will be described as the remainder can be deduced from the requirement that the matrix operations are consistent, for example where a matrix is subtracted from another matrix they must be of the same size. The control horizon is two timesteps and the prediction horizon is ten timesteps as for embodiments 1 and 2.

$\Delta u^{(i)}$ now has twelve elements, six for each timestep of the control horizon. $M_3$ to $M_{10}$ now have six rows and six columns although the last two elements of the leading diagonal are 0. The $G_n$ matrices now have six rows and six columns although, since there are only four temperature sensors, only the uppermost four rows of the $G_n$ matrices contain entries whilst the lowermost two rows are all zeros. The $\Lambda_n$ and $N_n$ matrices now have six rows and six columns although the last two elements of the leading diagonal are 0. L now has 24 rows and 12 columns. S now has 10 quadruplets of difference information whereas it previously consisted of 10 pairs of difference information. $w^{(i)}I$ now has 84 rows and 84 columns and $W^{(i)}$ now has 24 rows and 24 columns.

FURTHER EMBODIMENTS

In the first embodiment a timestep of 60 ms was used. In alternative embodiments other timesteps may be used although the choice of timestep is a compromise between computational burden of the controller and the quality of the control of the VGT and EGR actuators 125, 133. For example, a smaller timestep, say 30 ms, would mean that the control system 300 would have to complete all the calculations required at each timestep within 30 ms. Such a halving of the timestep would also increase the number of calculations to be performed at each timestep as instead of considering $C_{-7}$ to $C_{-2}$ and $P_3$ to $P_{10}$ the control system 300 would have to consider $C_{-14}$ to $C_{-4}$ and $P_6$ to $P_{20}$. A useful rule of thumb is that the size of the timesteps should be such that roughly ten timesteps span the 10% to 90% response time of the system being controlled. The 10% to 90% response time of the engine is the time that, for example following a change in the VGT actuator 125 setting, it takes to go from 10% of the change to 90% of the change.

In the first embodiment $C_{-7}$ to $C_{-2}$ and $P_{-2}$ to $P_0$ were used to predict $P_1$ to $P_{10}$. In general, the amount of past data used by the predictive model 301 is chosen empirically so as to minimise the computational burden of the control system 300 whilst providing predictions of sufficient accuracy. For example, in an alternative embodiment also having a timestep of 60 ms, the control system 300 may use VGT information from $C_{-10}$ to $C_{-2}$ and EGR information from $C_{-6}$ to $C_{-1}$ to predict $P_1$ to $P_{11}$, of which $P_5$ to $P_{11}$ may be used to cost a $C_0$ candidate.

In some applications it may be found difficult to accurately model the future behaviour of the system using a single set of parameters. In such applications it may be desirable to alter the parameters being used in the model in dependence upon a measured value. For example, in embodiment 1 the speed in r.p.m. of the turbine 123 could be measured by a sensor (not shown) and used to select one of several alternative models to predict the future airflows around the engine. The alternative models may either simply use different parameters or may use structurally different models, for example using differing amounts of past data concerning the recent past positions of the VGT and EGR actuators 125, 133.

In the embodiments described earlier the weighting between the various parts of the cost function was maintained constant. For example, for embodiment 1 the influence of the transient part of the cost function was controlled by the constants $k_{a1}$ and $k_{e1}$ whilst that of the steady state part of the cost function was controlled by the constants $k_{a3}$ and $k_{e3}$. In an alternative embodiment the weighting between the transient and steady state parts of the cost function may be varied depending upon the conditions of the system. For example, the weightings used for embodiment 1 may be varied in response to the rate of change of the LOAD signal or to the rate of change of the speed of the turbine 123. Correspondingly, for embodiment 3 the weightings may be varied in response to the rate of change of temperature of one or more the temperature sensors. In other embodiments the terms associated with the actuation cost may either be ignored by setting $k_{a2}$ and $k_{e2}$ to 0 or may be removed altogether.

The embodiments hitherto discussed used ARIMA models to predict the future behaviour of the Diesel engine 100 and of the bakery. Other types of model, for example neural networks, may be used in other embodiments. Alternative embodiments may employ different cost functions from that of equations (11) and (12). For example, different cost functions may, instead of squaring the errors, add the absolute value of the errors together or may omit the cost terms associated with changing the settings of the actuators.

Embodiments 1 and 2 controlled the Diesel engine 100 on the basis of MAIR and MEGR. In another embodiment the control is instead performed on the basis of MAF and MAP. The measured values of MAF and MAP (from the mass air flow sensor 141 and the pressure sensor 142, respectively) are compared with steady state values of MAF and MAP and with predicted values of MAF and MAP. However, the use of MAIR and MEGR is preferred as these two quantities correspond more directly with the physical conditions around the Diesel engine 100. This improved correspondence allows the predictor 706 to predict more accurately the future behaviour of the Diesel engine 100. Similarly, as those skilled in the art will appreciate, the engine may be controlled on the basis of the oxygen-to-fuel ratio (OFR) and the burnt gas fraction (BGF) instead of the AFR and EGR fraction. Using the OFR allows unreacted oxygen in the EGR gas 106 to be considered when determining the required mass flow rate of intercooled air 102$b$.

Embodiments 1 and 2 were described using a VGT. In an alternative embodiment a variable nozzle turbocharger (VNT) may be used instead of a VGT. A variable supercharger, for example a Roots blower driven by a variable speed electric motor, may be used instead of a VGT or VNT.

In embodiments 1 to 3, $C_{-1}$ was used as an initial value when determining the most suitable $C_0$ candidate for updating the VGT and EGR actuators 125, 133 and for updating the air conditioning units. In other embodiments the values suggested by the steady state maps 601 may be used (instead of $C_{-1}$) as the loci of the $C_0$ candidates to be considered by an embodiment similar to that of embodiment 1, or as the initial value for the MWLS algorithm.

In embodiments 1 and 2 the timestep was 60 ms for the inputs to the controller 201 and for its outputs. In some embodiments it may be desirable to have different sampling rates for the inputs and outputs. For example, embodiment 1 could be modified to sample MAIR and MEGR and to predict future airflows using a 30 ms timestep while the VGT and EGR actuators 125, 133 could be updated every 60 ms. As this modification would entail twice as much input data as output data, the transient coster 709 could either cost two predictions for every actuation or the transient coster 706 could disregard alternate predictions. In an analogous modification, different inputs to the controller could be sampled at different sampling rates and different outputs could be updated at different updates rates.

The timestep may be varied (for example in the case of embodiments derived from embodiments 1 and 2) if the LOAD and SPD signals are sufficiently steady, from 60 ms to, say, 150 ms. This would free the microprocessor 203 to perform other activities when the Diesel engine 100 is operating under substantially steady state conditions. Of course, if the LOAD and/or SPD signals varied sufficiently then the timestep would have to be reduced accordingly. Note also that MAIR and MEGR are still preferably measured every, say, 30 ms so that the predictor 706 always has valid predictions ready for the transient coster 706 in the event that LOAD and/or SPD fluctuate. In yet another embodiment the settings of the VGT and EGR actuators 125, 133 are only changed when the cost (either the cost for the timestep being considered or the cost accumulated over several timesteps since the last change of the actuator settings) exceeds a predetermined amount.

The steady state maps 601 of embodiments 1 and 2 gave substantially optimum settings for the VGT and EGR actuators 125, 133 under steady state conditions. It is however not essential that the steady state map 601 give optimum settings but merely that the settings are sufficiently accurate for the application. For example, rather than testing the Diesel engine 100 in the system 900 a computational fluid dynamics simulation of the Diesel engine 100 could be performed to determine the parameters of the steady state maps. The steady state maps 601 are conveniently implemented as look up tables but could instead be in the form of equations giving outputs for VGT and EGR based on the values of the LOAD and SPD signals. In embodiments 1 to 3 a single set of steady state maps 601 was used. Alternative embodiments may be provided with a plurality of steady state maps. For example, the controller 201 may be provided with a plurality of steady state maps 601 so that the driver may select a "sports" or an "economy" mode for controlling the Diesel engine 100.

The calculation of model parameters was earlier described using equation (20) which involved the manipulation of large matrices (some of which contained ten thousand elements). As those skilled in the art will appreciate, an alternative and preferred method is recursive least squares (RLS) which is described in Lennart Ljung's book. The RLS method is computationally less intensive and also requires less memory as it does not, for example, use all ten thousand measurements simultaneously.

Although it is preferable that the lowest cost $C_0$ candidate is used to update the actuators of the system being controlled, in some applications it may be acceptable to use a $C_0$ candidate that merely has a sufficiently low cost. For example, the generator 701 of embodiment 1 may be modified to select the first $C_0$ candidate that has an associated cost of less than 10 arbitrary units. If none of the first few $C_0$ candidates evaluated by the generator 701 had a cost less than 10 then the MWLS algorithm could be used to determine a $C_0$ candidate. In some applications this procedure may reduce the computational burden of the microprocessor 203 thereby allowing it to perform other activities.

In embodiments 1 to 3 the cost function of a $C_0$ candidate value for updating the actuators was established by subtracting the predicted outputs of the system being controlled from the required system outputs, and by subtracting the steady-state inputs to the system from those of the $C_0$ candidate being evaluated. As those skilled in the art will appreciate, there are alternative methods available for comparing the predicted outputs with the required outputs, and the steady-state settings with the candidate being evaluated. For example, the comparisons may be effected by inverting the sign of one of the numbers being compared and adding it to the number it is being compared with.

In some embodiments it may be more convenient to calculate the reciprocal of the cost in which case the optimum $C_0$ candidate would be that having the highest reciprocal cost. In embodiments 1 to 3 hitherto discussed the cost was arrived at by adding a transient cost to a steady state cost. In some applications better control may be realised by multiplying the transient cost with the steady state cost.

In embodiment 1 the generator 701 evaluated the costs for 25 different $C_0$ candidates and chose the optimum candidate. In an alternative embodiment, fewer $C_0$ candidates may be evaluated (for example 9) and interpolation may be used to estimate the location of a substantially optimum $C_0$ candidate. In embodiment 2 the MWLS algorithm was used to determine the substantially optimum $C_0$ candidate. An alternative algorithm for finding the substantially optimum $C_0$ candidate is Sequential Quadratic Programming although the MWLS algorithm is preferred as it is generally faster.

The predictive model used for embodiments 1 to 3 was a linear model. An advantage of using a linear model is that it allows linear algorithms such as the MWLS algorithm to be used to determine the substantially optimum $C_0$ candidate. However, in some applications it may be necessary to use a non-linear model. In other applications a neural network may be found to give better predictions of the future behaviour of the system that is being controlled.

MEGR for embodiments 1 and 2 was inferred by subtracting MAIR from the calculated induced airflow into the engine. In an alternative embodiment, MEGR is measured by sensing the pressure differential produced as the EGR gas 106 flows through a venturi (not shown). Sensing the pressure differential allows for a more accurate determination of MEGR but has the disadvantage that an extra sensor is required.

The ROM 204 of the controller 201 included the parameters and coefficients required for the predictor 706 and the summer 710 (embodiment 1) and the parameters and coefficients for the MWLS algorithm (embodiment 2). In alternative embodiments a generic controller may be customised for a particular application by providing the generic controller with appropriate information. The information may comprise the number of inputs and outputs to be controlled, parameters for the predictive model and coefficients for the summer 710 or for the MWLS algorithm, as appropriate. The controller 201 could be provided with the appropriate information either by plugging a ROM into a socket provided on the controller 201 or the controller 201 may be provided with electrically erasable and programmable read only memory ($E^2PROM$), or a floppy disk and drive, so that the appropriate information may be downloaded to the controller 201, for example by using an RS232 communication link via the internet. In some circumstances it may be more cost effective to embody the microprocessor 203 and ROM 204 as part of an application specific integrated circuit (ASIC) or to use dedicated circuitry instead of a microprocessor and program. Such dedicated circuitry would typically be digital though analogue circuitry may be used in some applications.

The controller 201 described earlier comprised 8 bit ADCs and DACs for converting analogue signals to a digital format and vice versa. Depending on the system being controlled, the ADCs and DACs may have more than or fewer than 8 bits, and may have different resolutions to each other. In other embodiments the sensors and/or actuators may include ADCs and DACS.

That which is claimed is:

1. An apparatus for controlling a system having a first number of system inputs and a second number of system outputs, by outputting, at intervals, signals for updating the system inputs, the apparatus comprising:
    means for receiving one or more signals indicative of target values for the system outputs;
    mapping means for using steady state information that relates the system outputs to the system inputs under steady state conditions, to determine a number, equal to the first number, of steady state values for the system inputs on the basis of the target output values;
    means for receiving a number, equal to the second number, of signals indicative of the system outputs;
    initial value means for producing at least one set of initial values, wherein each set consists of a number, equal to the first number, of values for use as a basis for determining a set of update values, wherein the set of update values consists of a number, equal to the first number, of values for updating the system inputs;
    prediction means for using a model of the system to predict, for each set of initial values, a set of future values of the system outputs on the basis of past system input values, past system output values and a respective set of initial values;
    first differencing means for determining differences between the steady state values and each set of initial values to give first difference information;
    second differencing means for determining differences between the target values and each set of predicted future values of the system outputs to give second difference information;
    combining means for combining the first difference information with the second difference information to give combined difference information;
    determining means for determining the set of update values on the basis of the combined difference information and each set of initial values; and
    output means for outputting signals, indicative of the set of update values, for updating the system inputs.

2. The apparatus according to claim 1, further comprising one or more sensors for producing signals indicative of the target values.

3. The apparatus according to claim 1, wherein the means for receiving signals indicative of target values comprises means for deducing the target values from the signals indicative of the target values.

4. The apparatus according to claim 1, wherein the mapping means comprises the steady state information.

5. The apparatus according to claim 1, wherein the mapping means comprises means for receiving the steady state information.

6. The apparatus according to claim 1, wherein the mapping means is operable to use a look-up table comprising the steady state information.

7. The apparatus according to claim 1, wherein the mapping means comprises means for receiving a first signal and wherein the mapping means is operable, in response to the first signal, to change the basis on which the mapping means determines steady state values.

8. The apparatus according to claim 7, wherein the mapping means is operable to change the basis by selecting, in response to the first signal, one of a plurality of sets of steady state information.

9. The apparatus according to claim 7, further comprising a sensor for producing the first signal.

10. The apparatus according to claim 1, further comprising a number, equal to the second number, of sensors for producing signals indicative of the system outputs.

11. The apparatus according to claim 1, wherein the prediction means is operable to use an auto regressive integrated moving average model to predict each set of future values.

12. The apparatus according to claim 1, wherein the prediction means comprises information specifying the type of model to be used.

13. The apparatus according to claim 12, wherein the prediction means comprises information specifying parameters of the model.

14. The apparatus according to claim 1, wherein the prediction means comprises means for receiving information specifying the type of model to be used.

15. The apparatus according to claim 14, wherein the prediction means comprises means for receiving a second signal and wherein the prediction means is operable to select the type of model to be used in response to the second signal.

16. The apparatus according to claim 15, wherein the second signal is indicative of a system output.

17. The apparatus according to claim 15, further comprising a sensor for producing the second signal.

18. The apparatus according to claim 1, wherein the prediction means comprises means for receiving information specifying parameters of the model.

19. The apparatus according to claim 1, wherein the prediction means comprises means for receiving a third signal and wherein the prediction means is operable, in response to the third signal, to alter a parameter of the model being used.

20. The apparatus according to claim 19, wherein the third signal is indicative of a system output.

21. The apparatus according to claim 19, further comprising a sensor for producing the third signal.

22. The apparatus according to claim 1, further comprising third differencing means for determining differences between the values of the most recently used set of update values and the values of each set of initial values to give third difference information, and
wherein the combining means is operable to combine the third difference information with the first difference information and the second difference information to give the combined difference information.

23. The apparatus according to claim 1, wherein the combining means comprises means for changing the relative significance in the combined difference information of the first difference information and the second difference information, in response to a fourth signal.

24. The apparatus according to claim 23, wherein the fourth signal is the rate of change of a signal indicative of a target value.

25. The apparatus according to claim 23, wherein the apparatus comprises a sensor for producing the fourth signal.

26. The apparatus according to claim 1, wherein the initial value means is operable to produce one set of initial values and to use the most recently used set of update values as the set of initial values.

27. The apparatus according to claim 1, wherein the initial value means is operable to produce a plurality of sets of initial values, the prediction means is operable to produce a plurality of respective sets of predicted future values, the first differencing means is operable to determine the first difference information by determining a respective first difference value for each of the sets of initial values, the second differencing means is operable to determine the second difference information by determining a respective second difference value for each of the sets of predicted future values so that for each of the first difference values there is a second difference value determined on the basis of the same set of initial values, the combining means is operable to combine each of the first difference values with its respective second difference value to give a plurality of combined difference values wherein each of the combined difference values is associated with a respective set of initial values, and the determining means is operable to select one or more sets of initial values on the basis of their associated combined difference values for use in determining the set of update values.

28. The apparatus according to claim 27, wherein the determining means is operable to select one of the sets of initial values and to use the selected set of initial values as the set of update values.

29. The apparatus according to claim 27, wherein the determining means is operable to select two or more of the sets of initial values and wherein the determining means comprises interpolation means operable to produce the set of update values by interpolating the two or more selected sets of initial values.

30. The apparatus according to claim 27, wherein the combining means is operable to combine the first difference values with their respective second difference values by addition.

31. The apparatus according to claim 27, wherein the initial value means is operable to produce at least one set of further initial values, wherein each set of further initial values consists of a number, equal to the first number, of values for use as a basis for determining a set of further update values for updating the system inputs at the beginning of an interval subsequent to the interval for which the system inputs are to be updated by the set of update values;
wherein each set of further initial values is associated with a respective set of initial values;
wherein, for each set of initial values, the prediction means is further operable to predict each set of future values of the system outputs on the basis of a respective set of further initial values as well as on the basis of past system input values, past system output values and a respective set of initial values; and
wherein the determining means is operable to consider the influence of each set of further initial values on the second difference information during the selection of one or more sets of initial values.

32. The apparatus according to claim 1, wherein the combination means comprises means for using matrix operations to combine the first difference information with the second difference information.

33. The apparatus according to claim 32, wherein the combining means and the determining means are operable to use the mixed weights least squares method to determine the set of update values by using information relating the response of the system outputs to a change of the system inputs.

34. The apparatus according to claim 33, wherein the combining means and the determining means are operable to determine a set of further update values, for updating the system inputs at the beginning of an interval subsequent to the interval for which the system inputs are to be updated by the set of update values, and wherein the combining means and the determining means are operable to determine the set of update values and the set of further update values on the basis of the information relating the response of the system outputs to a change of the system inputs.

35. The apparatus according to claim 1, further comprising an actuator for modifying a system input in response to a signal indicative of an update value.

36. The apparatus according to claim 1, wherein the apparatus is operable to output the signals for updating the system inputs at intervals of 60 milliseconds.

37. The apparatus according to claim 1, wherein the prediction means is operable to predict future values of the system outputs for the next ten intervals.

38. The apparatus according to claim 37, wherein the second differencing means is operable to determine differences for intervals from the third to the tenth intervals subsequent to the current interval.

39. The apparatus according to claim 1, wherein the apparatus comprises a processor and memory storing a sequence of instructions for execution by the processor.

40. The combination according to claim 1, wherein the system is a compression-ignition engine.

41. The combination according to claim 40, wherein the first number is two and the second number is two.

42. The combination according to claim 41, wherein the system comprises a variable geometry turbocharger and a variable exhaust gas recirculator and wherein the system inputs are the settings of the variable geometry turbocharger and of the variable exhaust gas recirculator and the system outputs are mass airflow and mass exhaust gas recirculation flow.

43. A computer program product comprising processor executable instructions defining a program for use in a processor based apparatus for controlling a system having a first number of system inputs and a second number of system outputs, by outputting, at intervals, signals for updating the system inputs, the program defining:

means for receiving one or more signals indicative of target values for the system outputs;

mapping means for using steady state information that relates the system outputs to the system inputs under steady state conditions, to determine a number, equal to the first number, of steady state values for the system inputs on the basis of the target output values;

means for receiving a number, equal to the second number, of signals indicative of the system outputs;

initial value means for producing at least one set of initial values, wherein each set consists of a number, equal to the first number, of values for use as a basis for determining a set of update values, wherein the set of update values consists of a number, equal to the first number, of values for updating the system inputs;

prediction means for using a model of the system to predict, for each set of initial values, a set of future values of the system outputs on the basis of past system input values, past system output values and a respective set of initial values;

first differencing means for determining differences between the steady state values and each set of initial values to give first difference information;

second differencing means for determining differences between the target values and each set of predicted future values of the system outputs to give second difference information;

combining means for combining the first difference information with the second difference information to give combined difference information;

determining means for determining the set of update values on the basis of the combined difference information and each set of initial values; and output means for outputting signals, indicative of the set of update values, for updating the system inputs.

44. The product according to claim 43, wherein the product is a programmed memory device.

45. The product according to claim 44, wherein the product is a signal suitable for transfer from a first processor based apparatus to a second processor based apparatus.

46. The product according to claim 45, wherein the second processor based apparatus is an apparatus comprising a processor and memory storing a sequence of instructions for execution by the processor.

47. A method of controlling a system having a first number of system inputs and a second number of system outputs, by outputting, at intervals, signals for updating the system inputs, the method comprising the steps of:

receiving one or more signals indicative of target values for the system outputs;

determining, on the basis of steady state information that relates the system outputs to the system inputs under steady state conditions, a first number of steady state values for the system inputs on the basis of the target output values;

receiving a number, equal to the second number, of signals indicative of the system outputs;

producing at least one set of initial values, wherein each set consists of a number, equal to the first number, of values for use as a basis for determining a set of update values, wherein the set of update values consists of a number, equal to the first number, of values for updating the system inputs;

using a model of the system to predict, for for each set of initial values, a set of future values of the system outputs on the basis of past system input values, past system output values and a respective set of initial values;

determining differences between the steady state values and each set of initial values to give first difference information;

determining differences between the target values and each set of predicted future values of the system outputs to give second difference information;

combining the first difference information with the second difference information to give combined difference information;

determining the set of update values on the basis of the combined difference information and each set of initial values; and outputting signals, indicative of the set of update values, for updating the system inputs.

* * * * *